United States Patent
Chun et al.

(10) Patent No.: US 12,359,057 B2
(45) Date of Patent: Jul. 15, 2025

(54) EPOXY RESIN, PREPARING METHOD THEREOF, EPOXY COMPOSITION COMPRISING THE SAME, AND USE THEREOF

(71) Applicant: KOREA INSTITUTE OF INDUSTRIAL TECHNOLOGY, Cheonan-si (KR)

(72) Inventors: Hyun Aee Chun, Suwon-si (KR); Sook Yeon Park, Gunpo-si (KR); Yun Ju Kim, Seoul (KR); Su Jin Park, Osan-si (KR)

(73) Assignee: KOREA INSTITUTE OF INDUSTRIAL TECHNOLOGY, Chungcheongnam-do (KR)

( * ) Notice: Subject to any disclaimer, the term of this patent is extended or adjusted under 35 U.S.C. 154(b) by 196 days.

(21) Appl. No.: 17/884,580

(22) Filed: Aug. 10, 2022

(65) Prior Publication Data

US 2023/0146767 A1    May 11, 2023

(30) Foreign Application Priority Data

Nov. 5, 2021    (KR) .................... 10-2021-0151657

(51) Int. Cl.
*C08L 63/00* (2006.01)
*C08G 59/24* (2006.01)
(Continued)

(52) U.S. Cl.
CPC ............ *C08L 63/04* (2013.01); *C08G 59/245* (2013.01); *C08G 59/4085* (2013.01);
(Continued)

(58) Field of Classification Search
CPC ... C08L 63/04; C08G 59/245; C08G 59/4085; C08G 59/5006; C08G 59/621; C08G 59/688
(Continued)

(56) References Cited

U.S. PATENT DOCUMENTS

| 6,492,483 B1 | 12/2002 | Li et al. |
| 2015/0247033 A1 | 9/2015 | Chun et al. |

(Continued)

FOREIGN PATENT DOCUMENTS

| JP | 11172194 A | 6/1999 |
| JP | 2001172362 A | 6/2001 |

(Continued)

OTHER PUBLICATIONS

Takahashi et al., JP 2016-084467 A machine translation in English, May 19, 2016. (Year: 2016).*

(Continued)

*Primary Examiner* — David T Karst
(74) *Attorney, Agent, or Firm* — CANTOR COLBURN LLP

(57) ABSTRACT

The present disclosure relates to an epoxy resin of which distribution of molecular weight having distribution range of molecular weight of 300 to 2,000,000 is adjusted such that an upper limit value is increased to a maximum of 2,000,000, a method of preparing the same, a composition comprising the same, and a use thereof. The epoxy resin having controlled distribution of molecular weight of the present disclosure may have improved thermal properties of an epoxy system by expanding the distribution of molecular weight, and may exhibit excellent processability.

20 Claims, 1 Drawing Sheet

(51) Int. Cl.
*C08G 59/40* (2006.01)
*C08G 59/50* (2006.01)
*C08G 59/62* (2006.01)
*C08G 59/68* (2006.01)
*C08L 63/04* (2006.01)

(52) U.S. Cl.
CPC ....... *C08G 59/5006* (2013.01); *C08G 59/621* (2013.01); *C08G 59/688* (2013.01)

(58) Field of Classification Search
USPC ........................................................ 525/523
See application file for complete search history.

(56) References Cited

U.S. PATENT DOCUMENTS

| | | |
|---|---|---|
| 2015/0361211 A1 | 12/2015 | Chun et al. |
| 2017/0066789 A1 | 3/2017 | Tak et al. |
| 2019/0135970 A1 | 5/2019 | Chun et al. |
| 2019/0345174 A1 | 11/2019 | Kim et al. |

FOREIGN PATENT DOCUMENTS

| | | |
|---|---|---|
| JP | 2003141933 A | 5/2003 |
| JP | 2006169368 A | 6/2006 |
| JP | 2016084467 A | 5/2016 |
| JP | 2017506285 A | 3/2017 |
| JP | 2019196483 A | 11/2019 |
| KR | 10-2014-0036983 A | 3/2014 |
| KR | 10-2014-0106441 A | 9/2014 |
| KR | 101967155 B1 | 4/2019 |
| KR | 10-2019-0128483 A | 11/2019 |

OTHER PUBLICATIONS

Japanese Office Action for JP Application No. 2022-147381 mailed on Oct. 25, 2023.
Korean Office Action for KR Application No. 10-2021-0151657 mailed on Sep. 25, 2023.
Korean Notice of Allowance for KR Application No. 10-2021-0151657 mailed on Jun. 3, 2024.

\* cited by examiner

EPOXY RESIN, PREPARING METHOD THEREOF, EPOXY COMPOSITION COMPRISING THE SAME, AND USE THEREOF

CROSS-REFERENCE TO RELATED APPLICATION(S)

This application claims benefit of priority to Korean Patent Application No. 10-2021-0151657 filed on Nov. 5, 2021 in the Korean Intellectual Property Office, the disclosure of which is incorporated herein by reference in its entirety.

BACKGROUND

1. Field

The present disclosures relate to an epoxy resin in which distribution of molecular weight is adjusted, a method of preparing the same, a composition comprising the same, and a use thereof, and more particularly, to an epoxy resin of which a distribution range of molecular weight is expanded from a low molecular weight region to a high molecular weight region by a linkage reaction with a bifunctional aromatic alcohol, a method of preparing the same, a composition comprising the same, and a use thereof.

2. Description of Related Art

An epoxy material is widely used as a paint, a printed wiring board, an IC encapsulant, an electrical and electronic component, an adhesive, and the like, due to excellent mechanical properties, electrical insulation, heat resistance, water resistance and adhesive properties thereof.

However, a coefficient of thermal expansion (CTE) of an epoxy material is higher than that of a silicon wafer, and thus reliability and processability of components may be limited, when an epoxy material is applied to semiconductor packaging. Study to lower the coefficient of thermal expansion of an epoxy material has been continuously conducted, but the coefficient of thermal expansion of an epoxy material is still high, as compared to a required level. Accordingly, there has been demand for development of an epoxy material exhibiting improved coefficient of thermal expansion properties.

Also, a molecular weight of an epoxy resin affects material properties and processability. When an epoxy resin having a high molecular weight is used, toughness of a material and film formability may improve. However, viscosity may increase due to an increase in molecular weight, and processability may decrease due to the increased viscosity, which may be problematic. When an epoxy resin having a low molecular weight is used, processability may improve due to lowered viscosity, but flexibility or film formability of the material may be reduced. Accordingly, to improve physical properties of an epoxy resin and to ensure processability, it may be necessary to adjust distribution of molecular weight of an epoxy resin such that an epoxy resin of the low molecular weight and an epoxy resin of the high molecular weight epoxy resin are simultaneously present.

The inventors of the present disclosure have developed an epoxy resin having an alkoxysilyl group as an epoxy resin having improved thermal expansion properties (Korean Patent Application Nos. 10-2013-0111473, 10-2014-0021884, 10-2018-0052731, or the like) as an epoxy resin, and it was observed that, when an alkoxysilyl group is introduced to an epoxy resin, thermal expansion properties of an epoxy composite are greatly improved (that is, a CTE is reduced). In Korean Patent Application No. 10-2018-0052731, relating to a method of preparing an epoxy compound having an alkoxysilyl group, an epoxy compound having an alkoxysilyl group may be relatively easily prepared using a mild catalyst and a monofunctional aromatic alcohol as a ring-opening agent. However, since only monofunctional aromatic alcohol is used as a ring-opening agent, it may be difficult to control a molecular weight, specifically, to increase a molecular weight of an epoxy resin having an alkoxysilyl group as compared to an epoxy resin which is a starting material. That is, it may be difficult to control distribution of molecular weight over a low molecular weight region and a high molecular weight region.

SUMMARY

Present disclosure is to address the issues related to an epoxy resin described above, that is, the issue in which it may be difficult to control to have distribution of molecular weight over a low molecular weight region and a high molecular weight region, and is to provide an epoxy resin of which distribution of molecular weight is adjusted, a method of preparing the same, a composition comprising the same, and a use thereof.

According to the first aspect of the present disclosure, an epoxy resin having a controlled molecular weight distribution comprises (1) one of a first structural unit selected from a group consisting of formulas (AF), (BF), (CF) and (DF); and (2) one of a second structural unit selected from a group consisting of formulas (1F), (2F), (3F), (4F) and (5F), wherein the first structural unit and the second structural unit are connected to each other via formula (L), and wherein epoxy equivalent weight (EEW, Epoxy Equivalent Weight) determined by the glycidyl group of formula (E) is 200 g/Eq to 1,000 g/Eq, and the distribution range of the molecular weight is 300 to 2,000,000:

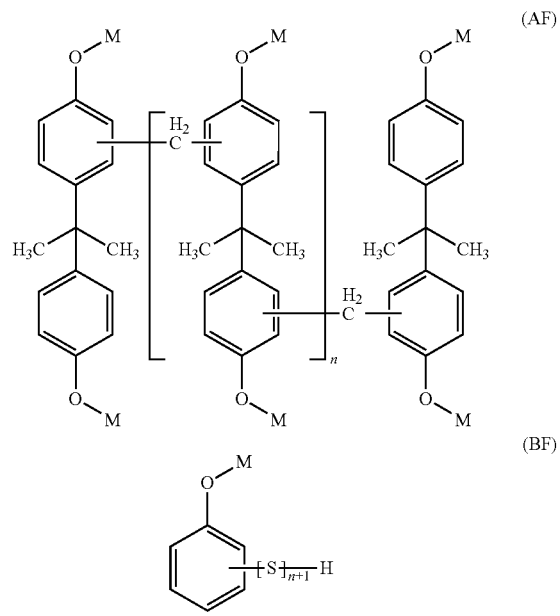

-continued

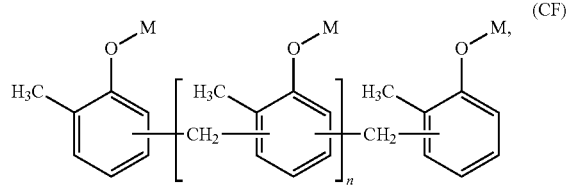
(CF)

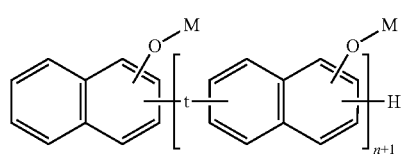
(DF)

(In formula (BF), S is

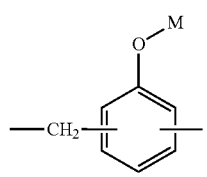

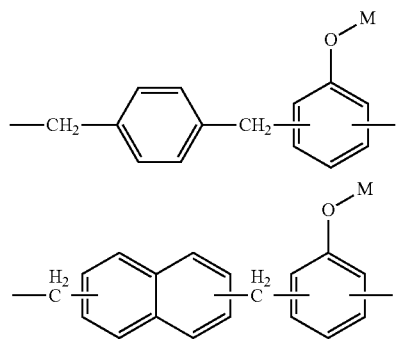

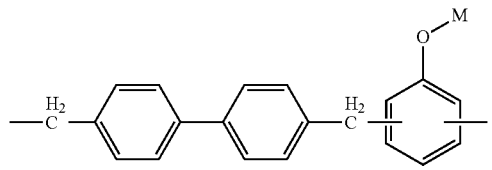

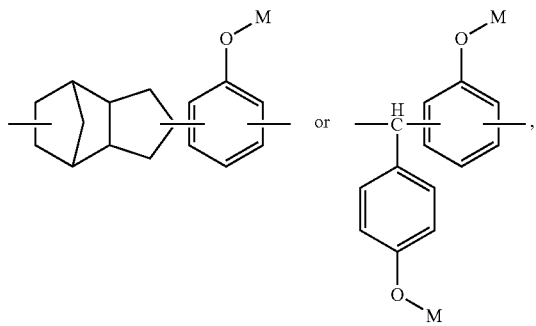 or in formula (DF), t is

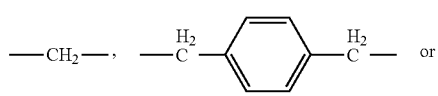 or

-continued

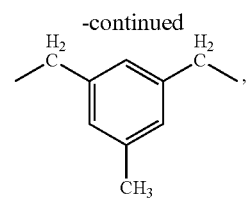

in formulas (AF) to (DF), n is an integer from 1 to 100, the epoxy resin has or does not have at least one of formulas (S1) and (S2), when the epoxy resin has at least one of formulas (S1) and (S2), at least one of a plurality of M is connected by a single bond to  in formula (L), a part of the remainder of M is a glycidyl group of following formula (E) such that an epoxy equivalent weight (EEW) of an epoxy resin is 200 g/Eq to 1,000 g/Eq, and the remainder of M is at least one selected from a group consisting of formula (S1) and (S2), when the epoxy resin does not have at least one of formulas (S1) and (S2), at least one of a plurality of M is connected by a single bond to  in formula (L), and the remainder of M is a glycidyl group of following formula (E) such that an epoxy equivalent weight (EEW) of an epoxy resin is 200 g/Eq to 1,000 g/Eq.

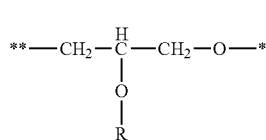
(L)

(In formula (L), R is H or —C(=O)—NH—(CH$_2$)$_3$—SiR$_1$R$_2$R$_3$, where at least one of R$_1$ to R$_3$ is a C$_1$-C$_5$ alkoxy group, preferably a C$_1$-C$_3$ alkoxy group, and the remainder is a C1-C10 alkyl group, and

** is a connection by a single bond to M in formulas (AF), (BF), (CF) or (DF), and * is a connection by a single bond to * in formulas (1F), (2F), (3F), (4F) or (5F).)

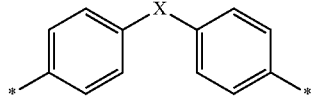
(1F)

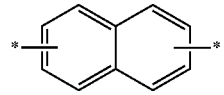
(2F)

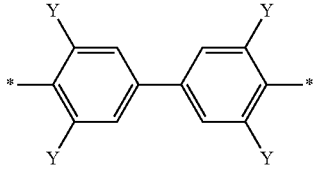
(3F)

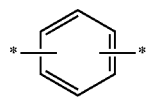
(4F)

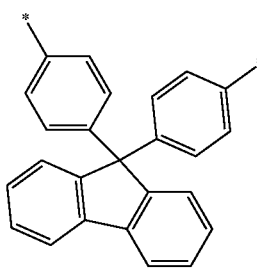

(5F)

(In formula (1F), X is —CH$_2$—, —C(CH$_3$)$_2$—, —C(CF$_3$)$_2$—, —S— or —SO$_2$—, and in formula (3F), each Y is independently selected from H and a methyl group, each * in formulas (1F) to (5F) is a connection by a single bond to * in formula (L).)

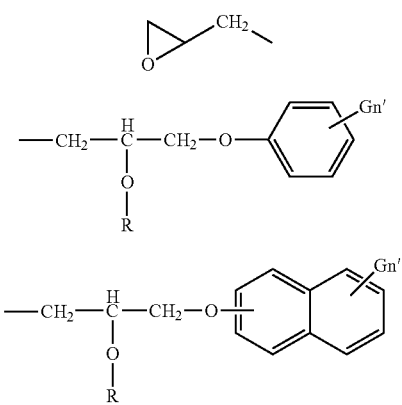

(In formulas (S1) and (S2), R is hydrogen or —C(=O)—NH—(CH$_2$)$_3$—SiR$_1$R$_2$R$_3$, where at least one of R$_1$ to R$_3$ is a C$_1$-C$_5$ alkoxy group, and the remainder is a C1-C10 alkyl group, each G is independently selected from a group consisting of a C1 to C10 alkyl group, an allyl group, and a C6 or C10 aryl group, and each n' is independently an integer of 0 to 5.)

According to the second aspect of the present disclosure, the epoxy resin is provided in which a content of the epoxy resin, which is a high molecular weight region having a molecular weight of more than 70,000 to 2,000,000, may be 3 vol % to 50 vol % (i.e. 3 vol % or more to 50 vol % or less), and a content of the epoxy resin, which is a low molecular weight region having a molecular weight of 300 to 70,000 or less, may be 50 vol % to 97 vol %, based on a total volume of the epoxy resin.

According to the third aspect of the present disclosure, the epoxy resin is provided in which in the low molecular weight region, a content of the epoxy resin having a molecular weight of 300 to 2,000 may be 30 vol % to 90 vol %, and a content of the epoxy resin having a molecular weight of more than 2,000 to 700,000 may be 10 vol % to 70 vol %, based on a total volume of the epoxy resin, which is the low molecular weight region.

According to the fourth aspect of the present disclosure, the epoxy resin is provided in which the epoxy resin wherein a molar ratio of [alkoxysilylgroup]/[epoxide group] of 0.5 or less.

According to the fifth aspect of the present disclosure, a method of preparing an epoxy resin by a molecular weight control reaction of mixing one of an epoxy resin selected from a group consisting of formulas (AS) to (DS) and one of difunctional aromatic alcohol selected from a group consisting of formulas (1) to (5) in a presence of a phosphine-based catalyst and heating a mixture obtained by the mixing is provided:

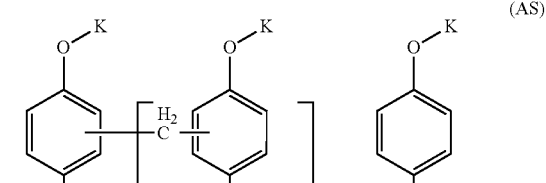

(AS)

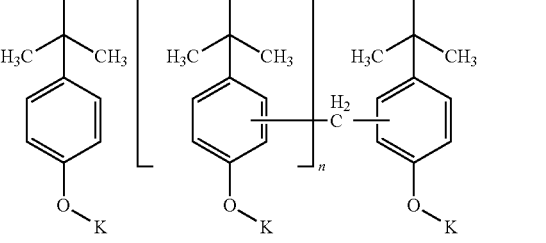

(BS)

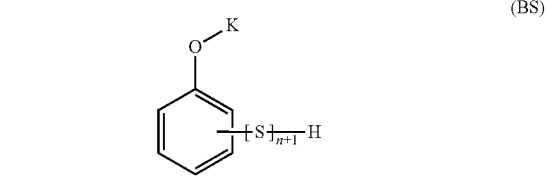

(CS)

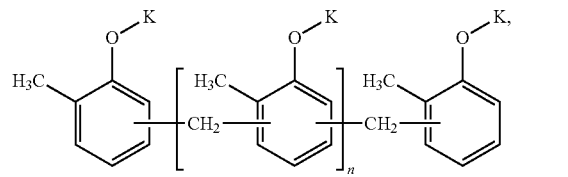

(DS)

(In formula BS, S is

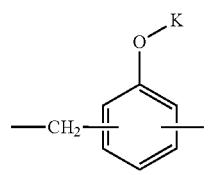

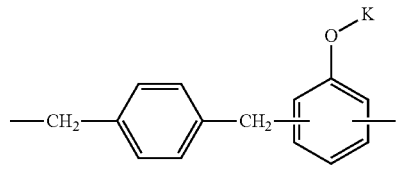

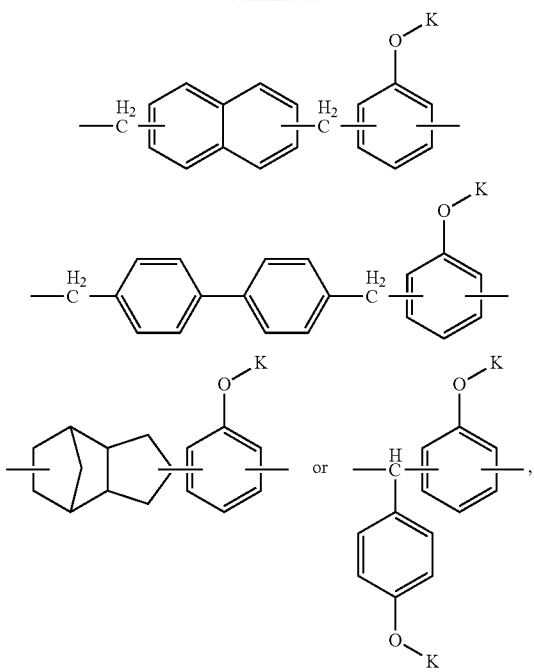

In formula DS, t is

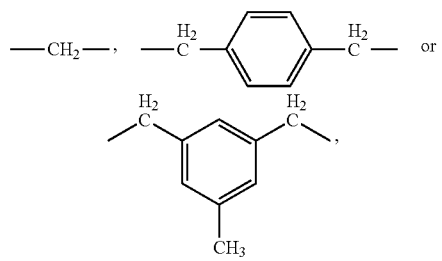

In formulas AS to DS, n is an integer from 1 to 100, and K is a glycidyl group of formula (E).

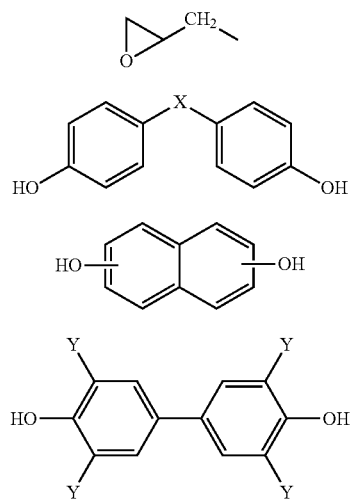

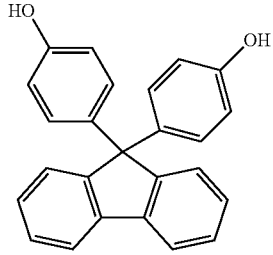

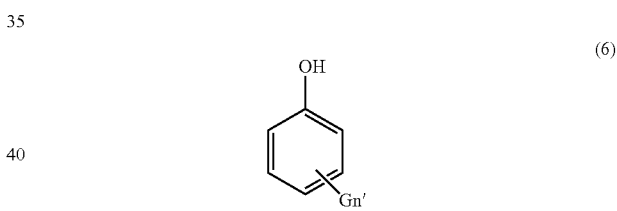

(In formula (1), X is —CH$_2$—, —C(CH$_3$)$_2$—, —C(CF$_3$)$_2$—, —S— or —SO$_2$—, and in formula (3), each Y is independently selected from a group consisting of H and a methyl group).

According to the sixth aspect of the present disclosure, a method of preparing an epoxy resin is provided in which difunctional aromatic alcohol is used in an amount that the hydroxyl group of the difunctional aromatic alcohol is 0.05 to 0.5 equivalents relative to 1 equivalent of the epoxy group of the epoxy resin as the starting material.

According to the seventh aspect of the present disclosure, a method of preparing an epoxy resin is provided in which at least one of monofunctional aromatic alcohol selected from formulas (6) and (7) may be used together with the difunctional aromatic alcohol:

(In the above formula, each G is independently selected from a group consisting of a C1 to C10 alkyl group, an allyl group, and a C6 or C10 aryl group, and each n' is independently an integer of 0 to 5.)

According to the eighth aspect of the present disclosure, a method of preparing an epoxy resin is provided in which the monofunctional aromatic alcohol may be used in an amount of 0.05 to 0.5 equivalents relative to 1 equivalent of an epoxy group of the epoxy resin which is a starting material.

According to the ninth aspect of the present disclosure, a method of preparing an epoxy resin is provided in which the molecular weight control reaction may be carried out at a temperature of 80° C. to 120° C.

According to the tenth aspect of the present disclosure, a method of preparing an epoxy resin is provided in which the molecular weight control reaction may be carried out for 1 hour to 12 hours.

According to the eleventh aspect of the present disclosure, a method of preparing an epoxy resin is provided in which after the molecular weight control reaction, an alkoxysilylation reaction by mixing an epoxy resin prepared by the molecular weight control reaction and an isocyanate alkoxysilane of formula B and heating a mixture obtained by the mixing may be further included.

$OCN(CH_2)_3SiR_1R_2R_3$ [Formula B]

(At least one of $R_1$ to $R_3$ is a $C_1$-$C_5$ alkoxy group, and the remainder is a C1-C10 alkyl group.)

According to the twelfth aspect of the present disclosure, an epoxy composition comprising the epoxy resin according to any aspect of the above is provided.

According to the thirteenth aspect of the present disclosure, the epoxy composition may further comprise an epoxy resin other than the epoxy resin.

According to the fourteenth aspect of the present disclosure, the epoxy composition according to the twelfth aspect may further comprise a thermoplastic resin.

According to the fifteenth aspect of the present disclosure, the epoxy composition according to the thirteenth aspect further comprise a thermoplastic resin.

According to the sixteenth aspect of the present disclosure, a cured product of the epoxy composition according to any aspect of the above is provided.

According to the seventeenth aspect of the present disclosure, an article comprising the cured product according to the sixteenth aspect is provided.

According to an eighteenth aspect of the present disclosure, the article may be at least one selected from a group consisting of a semiconductor packaging material, a semiconductor component, a semiconductor device, an electrical material, an electrical component, an electrical device, an electronic material, an electronic component, and an electronic device.

BRIEF DESCRIPTION OF DRAWINGS

The above and other aspects, features, and advantages of the present disclosure will be more clearly understood from the conforming to detailed description, taken in conjunction with the accompanying drawings, in which.

DETAILED DESCRIPTION

Figure 1:
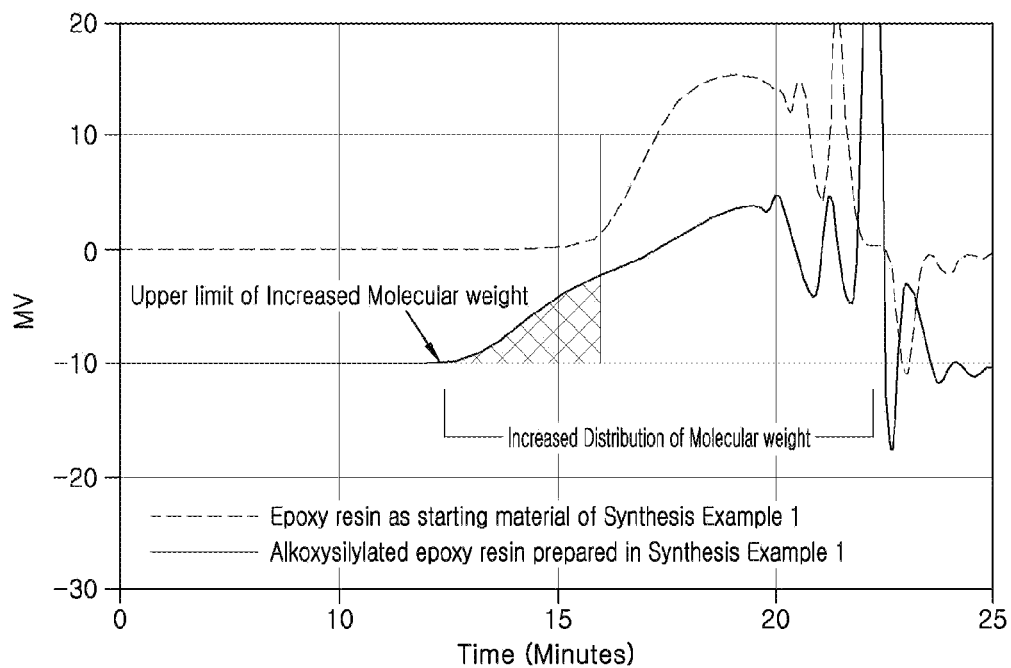
FIG. 1 is a gel permeation chromatograph of an epoxy resin, a starting material, of synthesis example 1 and a prepared alkoxysilylated epoxy resin.

Hereinafter, embodiments of the present disclosure will be described as follows with reference to the attached drawings.

As mentioned above, the present disclosure is to address the limitations for expanding a molecular weight range of a conventional epoxy resin. According to the present disclosure, the epoxy resin may have an expanded distribution range of molecular weight to have a low molecular weight region to a high molecular weight region. In the present disclosure, the "low molecular weight region" refers to a molecular weight region having a molecular weight of 70,000 or less, such as, for example, 300 to 70,000. A "high molecular weight region" in the present disclosure refers to a molecular weight region having a molecular weight greater than 70,000, such as, for example, greater than 70,000 to 2,000,000, or greater than 70,000 to 1,000,000. In the present disclosure, "the distribution of molecular weight is controlled" may indicate that the distribution of molecular weight is controlled so as to have a molecular weight to have a low molecular weight region to a high molecular weight region.

A. Epoxy resin of which distribution of molecular weight is controlled.

According to an embodiment of the present disclosure, an epoxy resin having a controlled molecular weight distribution is provided, the epoxy resin comprising:

(1) one of a first structural unit selected from a group consisting of formula (AF), formula (BF), formula (CF) and formula (DF); and (2) one of a second structural unit selected from a group consisting of formula (1F), formula (2F), formula (3F), formula (4F) and formula (5F), wherein the first structural unit and the second structural unit are connected to each other via formula (L), and wherein an epoxy equivalent weight (EEW) determined by a glycidyl group of formula (E) is 200 g/Eq to 1,000 g/Eq, and distribution range of molecular weight is 300 to 2,000,000.

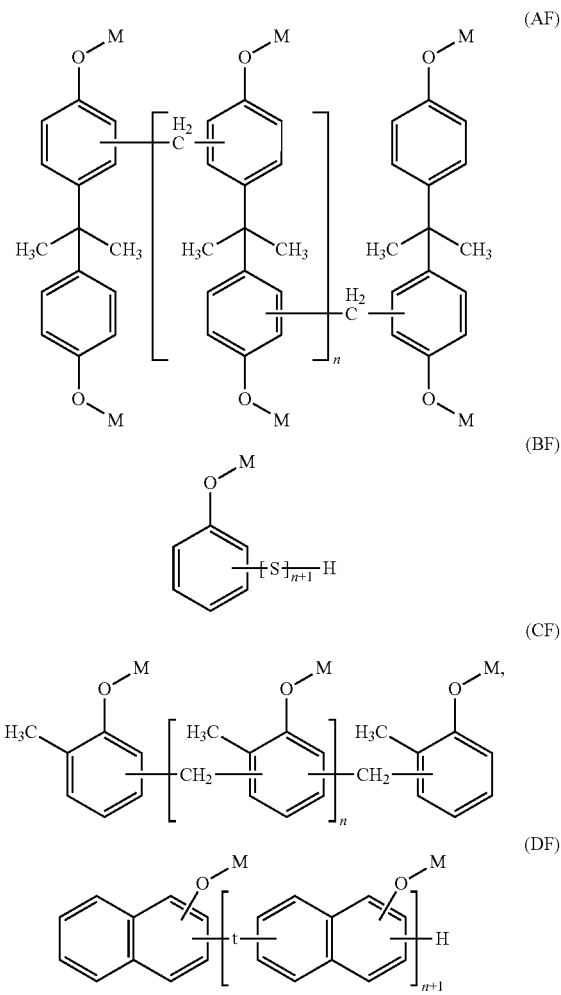

(In formula (BF), S is

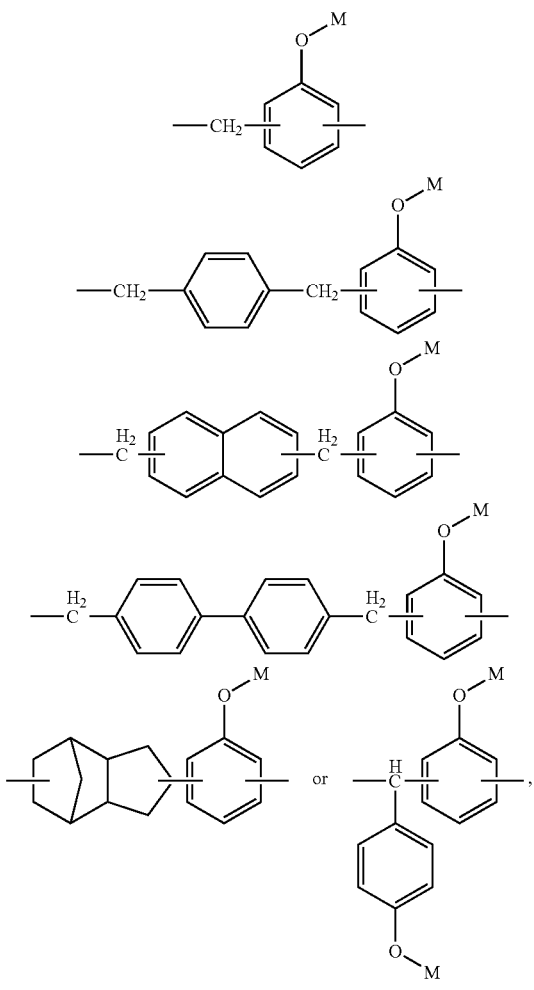

in formula (DF), t is

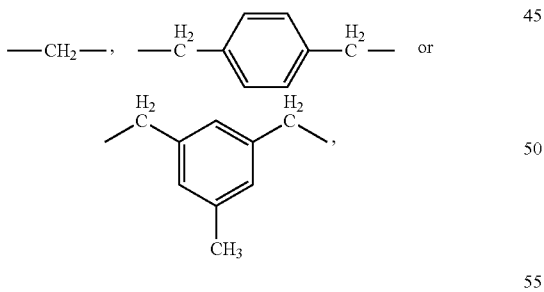

in formulas (AF) to (DF), n is an integer from 1 to 100,
the epoxy resin has or does not have at least one of formulas (S1) and (S2),
when the epoxy resin has at least one of formulas (S1) and (S2), at least one of a plurality of M is connected by a single bond to  in formula (L), a part of the remainder of M is a glycidyl group of formula (E) such that an epoxy equivalent weight (EEW) of an epoxy resin is 200 g/Eq to 1,000 g/Eq, and the remainder of M is one selected from a group consisting of formula (S1) and (S2), when the epoxy resin does not have at least one of formulas (S1) and (S2), at least one of a plurality of M is connected by a single bond to  in formula (L), and the remainder of M is a glycidyl group of following formula (E) such that an epoxy equivalent weight (EEW) of an epoxy resin is 200 g/Eq to 1,000 g/Eq.

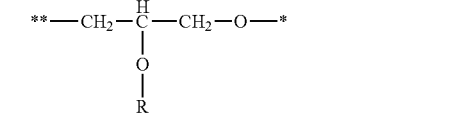

(L)

(In formula (L), R is H or —C(=O)—NH—(CH$_2$)$_3$—SiR$_1$R$_2$R$_3$, where at least one of R$_1$ to R$_3$ is a C1-C5 alkoxy group, more preferably, a C1-C3 alkoxy group, and the remainder is a C1-C10 alkyl group, and
** is a connection by a single bond to M in formulas (AF), (BF), (CF) or (DF), and * is a connection by a single bond to * in formulas (1F), (2F), (3F), (4F) or (5F).)

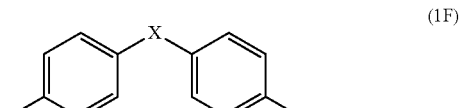

(1F)

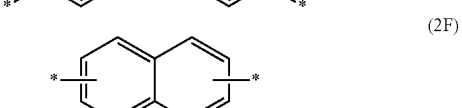

(2F)

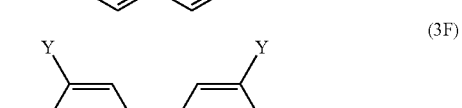

(3F)

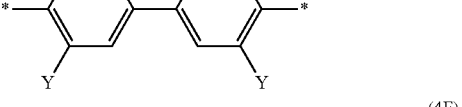

(4F)

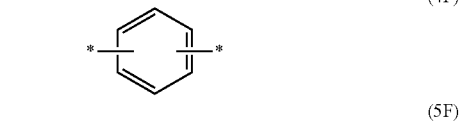

(5F)

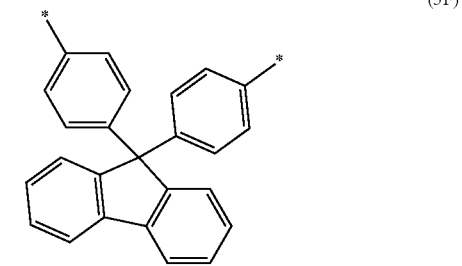

(In formula (1F), X is —CH$_2$—, —C(CH$_3$)$_2$—, —C(CF$_3$)$_2$—, —S— or —SO$_2$—, and in formula (3F), each Y is independently selected from H and a methyl group, each * in formulas (1F) to (5F) is a connection by a single bond to * in formula (L).)

(E)

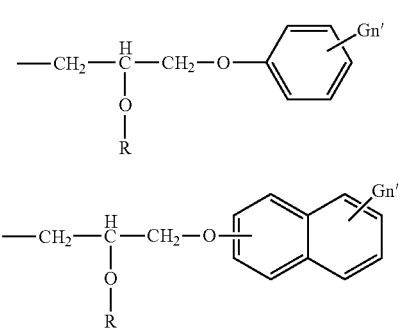

(In formulas (S1) and (S2), R is hydrogen or —C(=O)—NH—(CH$_2$)$_3$—SiR$_1$R$_2$R$_3$, where at least one of R$_1$ to R$_3$ is a C1-C5 alkoxy group, and preferably, a C1-C3 alkoxy group, and the remainder is a C1-C10 alkyl group, each G is independently selected from a group consisting of a C1 to C10 alkyl group, an allyl group, and a C6 or C10 aryl group, and each n' is independently an integer of 0 to 5.)

Also, as for the epoxy resin of which a molecular weight range is controlled (hereinafter, also referred to as "epoxy resin of the present disclosure" or "epoxy (F1) and/or epoxy (F2)"), an epoxy equivalent weight (EEW) determined by a glycidyl group of formula (E) may be 200 g/Eq to 1,000 g/Eq. When the EEW is less than 200 g/Eq, it may be difficult to secure an epoxy resin of high molecular weight, and when the EEW exceeds 1,000 g/Eq, a concentration of the epoxide group required for the epoxy resin may be insufficient.

In the epoxy resin of the present disclosure, the molecular weight of the epoxy resin may be increased by the linking group defined by formula (L), and accordingly, the epoxy resin may have a wide distribution range of molecular weight from a low molecular weight region to a high molecular weight region. The distribution range of molecular weight of the epoxy resin having controlled distribution of molecular weight of the present disclosure may be 300 to 2,000,000, such as, for example, 300 to 1,000,000, 300 to 500,000, or 300 to 100,000. The distribution of molecular weight is the molecular weight measured by gel permeation chromatography.

300, which is a lower limit of the distribution of molecular weight, may be a lower limit of the molecular weight of a conventional epoxy resin. The epoxy resin with the controlled molecular weight range in the present disclosure is characterized in that the molecular weight is increased from the lower limit of the molecular weight of the conventional epoxy resin to 2,000,000, and when the molecular weight exceeds 2,000,000, processability may be reduced due to an increase in viscosity.

Further, in the distribution of molecular weight of the epoxy resin of the present disclosure, (1) a content of the epoxy resin, which is a high molecular weight region having a molecular weight of more than 70,000 to 2,000,000, may be 3 vol % to 50 vol %, preferably 3 vol % to 40 vol %, and (2) a content of the epoxy resin, which is a low molecular weight region having a molecular weight of 300 to 70,000 or less, may be 50 vol % to 97 vol %, preferably 60 vol % to 97 vol %, based on the total volume of the epoxy resin. When the content of epoxy resin in the high molecular weight region is less than 3 vol % (that is, when the content of epoxy resin in the low molecular weight region exceeds 97 vol %), it may be difficult to observe physical properties effect due to the increase in molecular weight, and when the epoxy resin in the high molecular weight region exceeds 50 vol % (that is, when the low molecular weight epoxy resin is less than 50 vol %), processability may deteriorate and improvement of physical properties may not be expected.

Also, to ensure processability, in the lowmolecular weight region (a molecular weight of 300 to 70,000 or less), the content of the region having a molecular weight of 300 to 2,000 or less may be 30 vol % to 90 vol % and the content of the region having a molecular weight of more than 2,000 to 70,000 or less may be 10 to 70 vol % based on the total volume of the content of the epoxy resin which is the entire low molecular weight region, preferably, which may be to control viscosity more effectively to ensure processability.

Further, the epoxy resin of the present disclosure may preferably have a molar ratio of [alkoxysilyl group]/[epoxide group] of 0.5 or less. When the molar ratio of [alkoxysilyl group]/[epoxide group] exceeds 0.5, side reactions of between the alkoxysilyl groups may increase, which may not be preferable. Since the epoxy resin may not have an alkoxysilyl group, the lower limit of the molar ratio of [alkoxysilyl group]/[epoxide group] may not be specifically limited.

Specifically, the epoxy resin of which distribution of molecular weight is controlled according to the present disclosure may comprise chemical formulas (AF) and chemical formula (1F), chemical formula (AF) and chemical formula (2F), chemical formula (AF) and formula (3F), formula (AF) and formula (4F), formula (AF) and formula (5F), formula (BF) and formula (1F), formula (BF) and formula (2F), formula (BF) and formula (3F), formula (BF) and formula (4F) formula (BF) and formula (5F), formula (CF) and formula (1F) formula (CF) and formula (2F), formula (CF) and formula (3F) formula (CF) and formula (4F), formula (CF) and formula (5F) formula (DF) and formula (1F), formula (DF) and formula (2F) formula (DF) and formula (3F), formula (DF) and formula (4F) or formula (DF) and formula (5F), as the first structural unit and the second structural unit, respectively.

The epoxy resin having controlled distribution of molecular weight of the present disclosure may be used for various application, for example, electronic materials, such as but not limited to, semiconductor substrates such as IC substrates, laminates, prepregs, encapsulating materials (packaging material), printed wiring boards, electronic components, adhesives, paints, composite materials, or the like.

B. Method of Preparing Epoxy Resin

According to another embodiment of the present disclosure, a method of preparing an epoxy resin having controlled distribution of molecular weight by a molecular weight control reaction of an epoxy resin which is a starting material.

According to another embodiment of the present disclosure, the method of preparing an epoxy resin having controlled distribution of molecular weight may further include an alkoxysilylation reaction after the molecular weight control reaction if desired.

The method of preparing an epoxy resin having controlled distribution of molecular weight of the present disclosure may be as in reaction scheme 1 as below:

[Reaction Scheme 1]

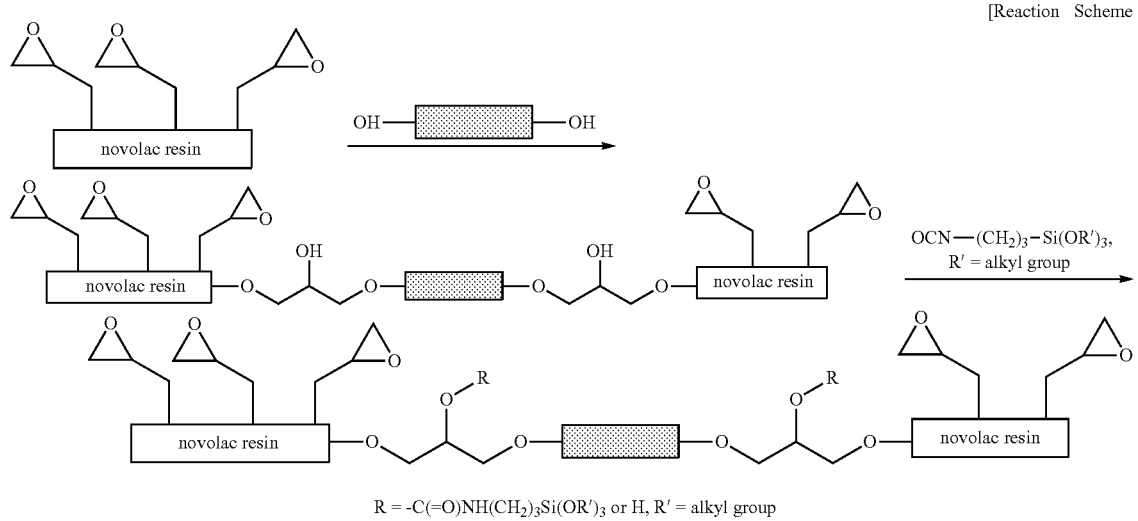

R = -C(=O)NH(CH$_2$)$_3$Si(OR')$_3$ or H, R' = alkyl group

The molecular weight control reaction of the epoxy resin, a starting material, may be carried out by reacting the starting material epoxy resin with a difunctional aromatic alcohol in the presence of a mild phosphine-based catalyst, where the reaction may be carried out by mixing the starting material epoxy resin and the difunctional aromatic alcohol and heating the mixture obtained by the mixing.

As the starting material, one of an epoxy resin selected from a group consisting of formulas (AS) to (DS) may be used.

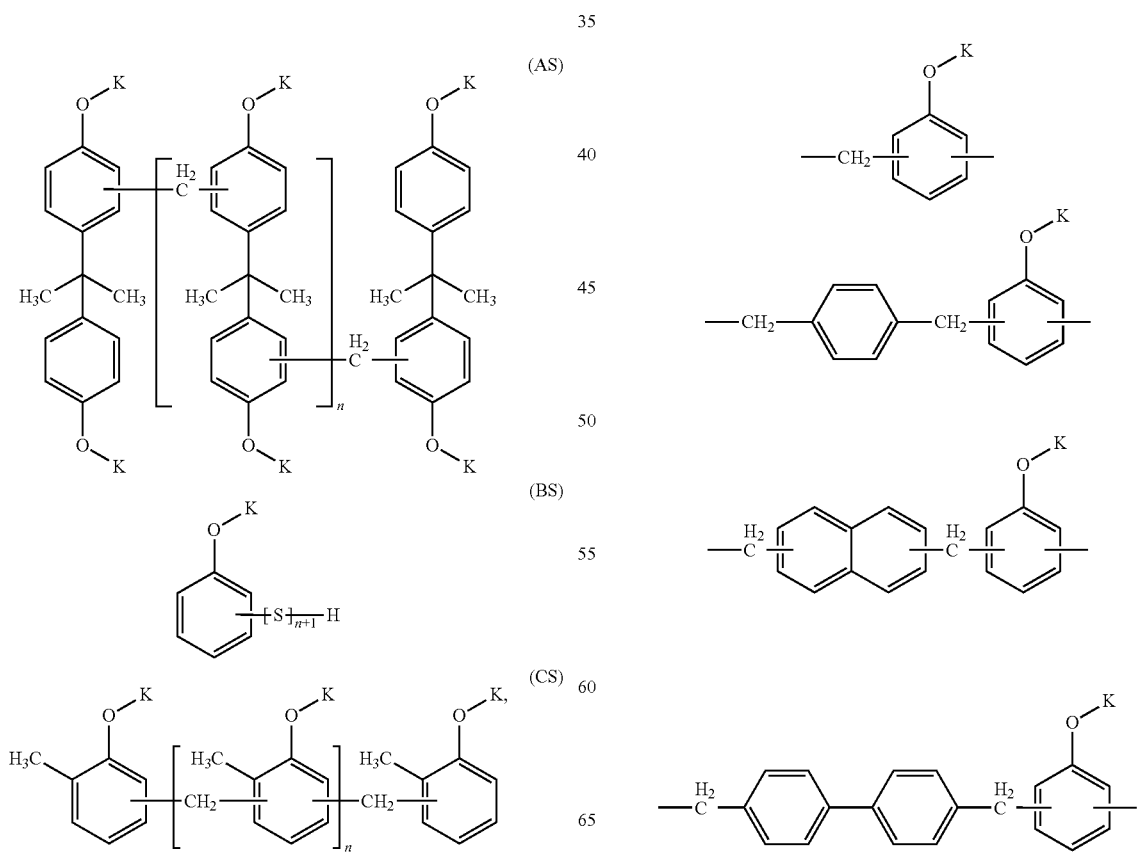

(In formula BS, S is

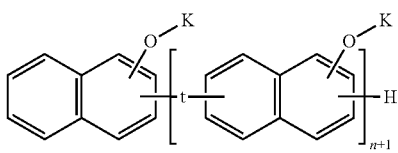

-continued

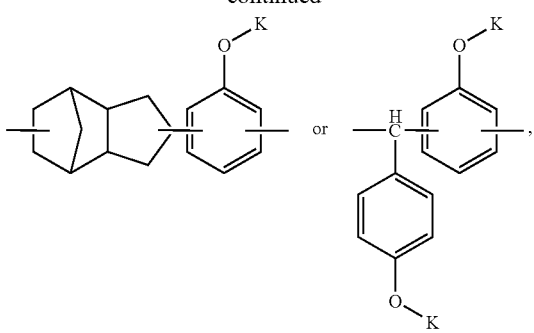

In formula DS, t is

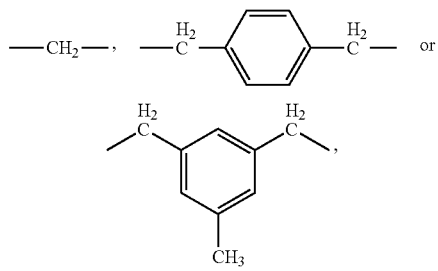

In formulas AS to DS, n is an integer from 1 to 100, and K is a glycidyl group of formula (E).

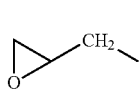
(E)

The number average distribution of molecular weight of the epoxy resin, a starting material, may be in the range of 300 to 30,000, which is a distribution range of molecular weight of a conventional epoxy resin, and is not particularly limited.

As the difunctional aromatic alcohol, one selected from a group consisting of formulas (1) to (5) may be used.

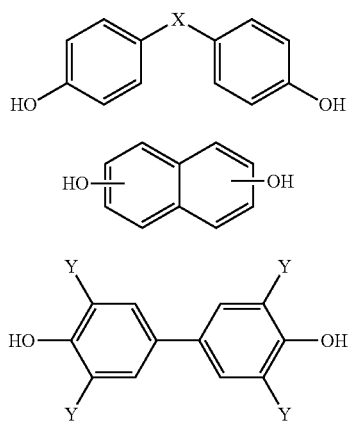

-continued

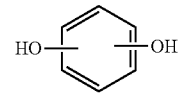
(4)

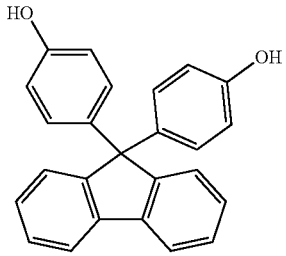
(5)

(In formula (1), X is —$CH_2$—, —$C(CH_3)_2$—, —$C(CF_3)_2$—, —S— or —$SO_2$—, and in formula (3), Y is each independently selected from a group consisting of H and a methyl group).

Also, if desired, a monofunctional aromatic alcohol may selectively be used together with the difunctional aromatic alcohol. By using the difunctional aromatic alcohol and the monofunctional aromatic alcohol together, it may be possible to more mildly control the high molecular weight of the epoxy resin.

As the monofunctional aromatic alcohol, one or more selected from a group consisting of phenols of formula (6) and naphthols of formula (7) may be used, or one selected from the group may be used.

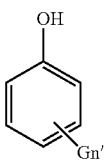
(6)

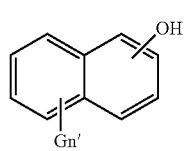
(7)

In formulas (6) and (7), G may be a substituent for a phenol or naphthol aromatic ring, and each G may be independently selected from a group consisting of a C1 to C10 alkyl group, an allyl group, and a C6 or C10 aryl group. Each n' may be independently an integer from 0 (that is, unsubstituted phenol or naphthol) to 5.

The difunctional aromatic alcohol may have two hydroxyl groups. In the molecular weight control reaction, by the linking group of formula (L) (provided that R=H) formed by the reaction of two hydroxyl groups of the difunctional aromatic alcohol and the epoxide group of the epoxy resin as a starting material, the epoxy resin which may be prepared by connecting the first structural unit derived from the epoxy resin, a starting material, and the second structural unit derived from the difunctional aromatic alcohol is highly polymerized to have a high molecular weight region. That is, by such a connection, an epoxy resin having a higher molecular weight than that of the epoxy resin, a starting material, may be prepared. The molecular weight of the epoxy resin obtained as above may have an expanded distribution range of molecular weight from a low molecular weight region to a high molecular weight region.

A difunctional aromatic alcohol may be used in an amount in which a hydroxyl group of the difunctional aromatic alcohol may become 0.05 to 0.5 equivalents, more preferably 0.05 to 0.4 equivalents, relative to 1 equivalent of the epoxy group of the epoxy resin, a starting material. When the difunctional aromatic alcohol is used in an amount in which the hydroxyl group is less than 0.05 equivalents relative to 1 equivalent of an epoxy group of the starting material, a ring opening rate may be low, and an increase in the highest molecular weight and expansion of the distribution of molecular weight may be poor. When the difunctional aromatic alcohol is used in an amount in which a hydroxyl group exceeds 0.5 equivalent relative to 1 equivalent of an epoxy group of the starting material, the increase in molecular weight of the epoxy resin may be too large, and gelation may occur.

Since the monofunctional aromatic alcohol has one hydroxyl group, the monofunctionalaromatic alcohol may not act to form a linkage between the aromatic core structure and the epoxy core structure. Accordingly, by using the monofunctional aromatic alcohol together if desired, the molecular weight of the epoxy resin, which is a product, may be controlled such that the molecular weight may not increase any more, and the creation of a hydroxy functional group which may participate in an additional alkoxysilylation reaction described later may increase. When a monofunctional aromatic alcohol is additionally used, the epoxy resin of the present disclosure may have a substituent represented by the above formulas S1 and S2.

Monofunctional aromatic alcohol may be used in an amount of 0.4 equivalent or less, preferably 0.05 to 0.4 equivalent, relative to 1 equivalent of the epoxy group of the epoxy resin, a starting material. The monofunctional aromatic alcohol may be a material optionally used additionally, and the lower limit of the amount thereof used is not limited. However, in order to achieve the purpose of use when monofunctional aromatic alcohol is added, the amount may be 0.05 equivalent or more, preferably. When the amount of the monofunctional aromatic alcohol is less than 0.05 equivalents, it may not be possible to secure sufficient hydroxyl group concentration according to the addition of the monofunctional aromatic alcohol, and when the amount exceeds 0.4 equivalents, it may be difficult to control the distribution of molecular weight expansion through molecular weight increase, which may not be preferable.

The molecular weight control reaction may be carried out in the presence of a mild catalyst. As the mild catalyst, a phosphine-based catalyst may be used. As the phosphine-based catalyst, for example, at least one selected from the group consisting of triphenylphosphine (TPP), diphenylpropylphosphine, and tricyclohexylphosphine, or one selected from the group may be used.

The phosphine-based catalyst may be used in an amount of 0.01 to 3 parts by weight, preferably 0.05 to 2 parts by weight, per 100 parts by weight of the epoxy resin, a starting material. When the amount of the phosphine-based catalyst used is less than 0.01 parts by weight, the control of distribution of molecular weight by increasing the reaction rate by the action of the catalyst may be poor, and no further improvement in the reaction rate may be observed even when the amount exceeds 3 parts by weight, such that it may not be preferable to use in excess of 3 parts by weight.

The phosphine-based catalyst may be oxidized and may lose catalytic activity when an entirety of the difunctional aromatic alcohol used in the molecular weight control reaction is consumed, such that (1) it may be easy to control the molecular weight, and (2) it may not be necessary to remove the residual phosphine-based catalyst, such that the preparation process may be simplified.

In the molecular weight control reaction, a base such as NaOH, KOH, $K_2HCO_3$, or $K_2CO_3$ may not be used as a catalyst. When such a base is used, it may be difficult to obtain an epoxy resin, which is a low molecular weight region having a molecular weight of 300 to 70,000, and a purification process such as a workup may be necessary after the molecular weight control reaction, and difficulties in the preparing process such as affecting the alkoxysilylation reaction is accompanied.

A solvent may be selectively used for the molecular weight control reaction if desired. For example, in the molecular weight control reaction, the solvent may not be used when viscosity of the reactant at the reaction temperature is suitable for the reaction to be carried out without a separate solvent. That is, when viscosity of the reactants is low enough to allow the mixing and stirring of the reactants to be carried out smoothly without a solvent, a solvent may not be necessary, which may be easily determined by a person skilled in the art. When a solvent is used, an organic solvent (aprotic solvent) may be used as long as the solvent may dissolve the reactants properly, may not adversely affect the reaction, and may be easily removed after the reaction. Examples of the solvent include, although are not limited thereto, acetonitrile, tetra hydro furan (THF), methyl ethyl ketone (MEK), dimethyl formamide (DMF), dimethyl sulfoxide (DMSO), toluene, or xylene and the like, and these solvents may be used alone or in combination of two or more. The amount of the solvent may not be particularly limited, and may be used in a suitable amount in a range in which the reactant is sufficiently dissolved and does not adversely affect the reaction, and a person skilled in the art may appropriately select the amount in consideration thereof.

The reaction temperature and reaction time of the molecular weight control reaction may vary depending on a type of reactant, and the molecular weight control reaction may be conducted at 80° C. to 120° C., preferably 100° C. to 120° C., for example. When the temperature is lowered to less than 80° C., a rate of the ring-opening reaction may be lowered, and when the temperature exceeds 120° C., side reactions may occur. The reaction time of the molecular weight control reaction may be 1 hour to 12 hours, preferably 2 hours to 6 hours. The optimal reaction time may be determined by the structure of an epoxy group, the degree of ring opening, a solvent, and the amount of the catalyst, and when the time is less than 1 hour, the reaction may not be completed, and when the time exceeds 12 hours, the additional reaction may not occur, and thus, the reaction for more than 12 hours may not be necessary.

By the molecular weight control reaction, for example, as in reaction scheme 2 below, various epoxy resins having various molecular weights may be prepared in a mixed state, which is common in the polymer resin production reaction, and is known to a person skilled in the art.

[Reaction Scheme 2]
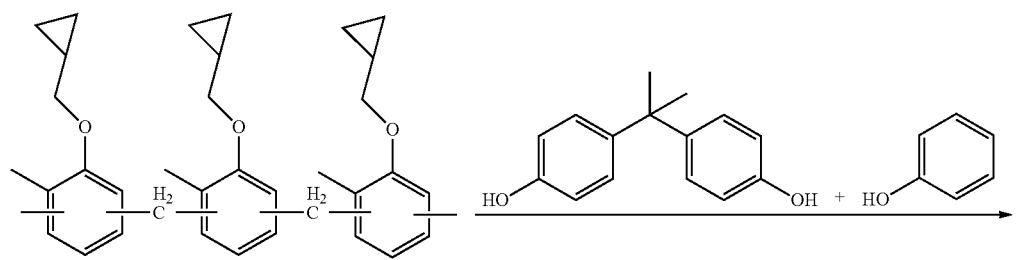
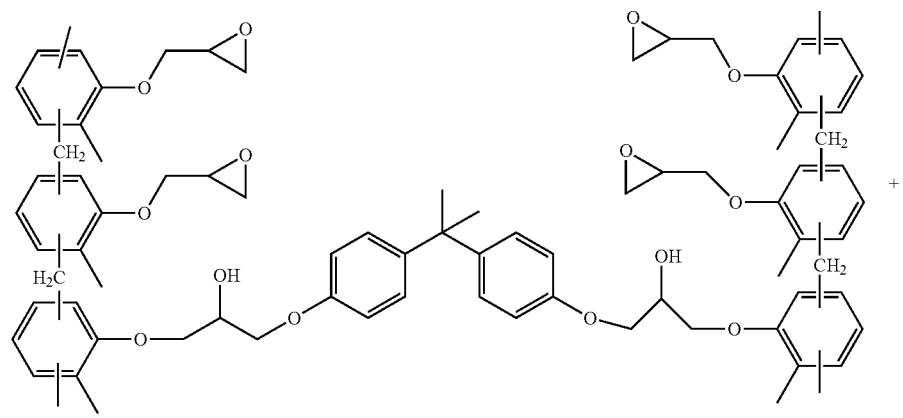
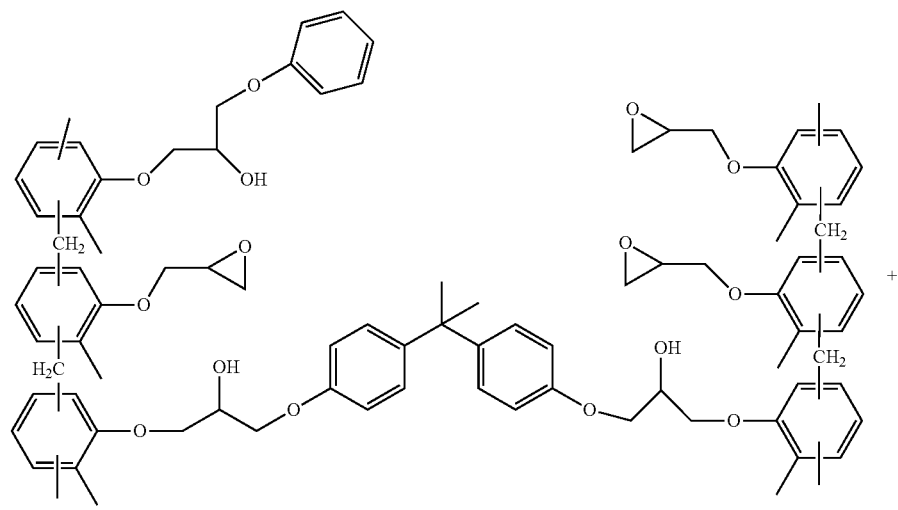

-continued

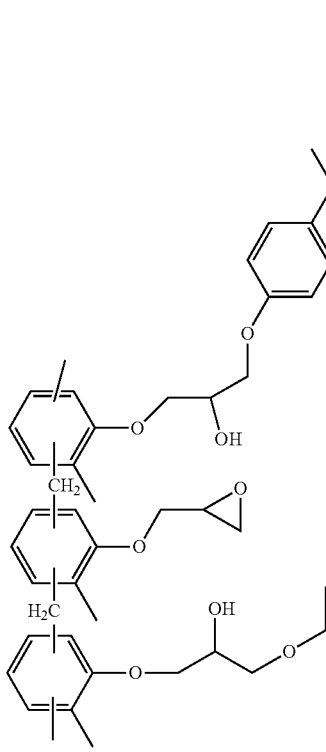
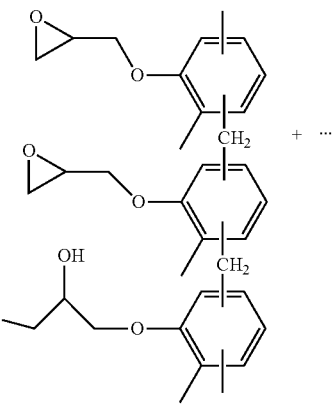

30

By the molecular weight control reaction, an epoxy resin in which the highest molecular weight is increased and a distribution range of molecular weight is expanded may be prepared. Also, epoxy resins having various molecular weight ranges may be formed together, and the epoxy resins may be prepared in a mixed state thereof and may be used as they are. Specifically, among the epoxy resins having controlled distribution of molecular weight of the present disclosure described in (A), an epoxy resin in which R═H in the formula (L), which is a linking group, and, if present, in the formulas (S1) and (S2), may be obtained.

After the molecular weight control reaction, an alkoxysilylation reaction of alkoxysilylating a hydroxyl group of the epoxy resin having controlled distribution of molecular weight prepared by the molecular weight control reaction may be additionally carried out if desired. As the alkoxysilylation reaction is further carried out, an alkoxysilyl group may be introduced into the hydroxyl group of the epoxy resin having controlled distribution of molecular weight such that an alkoxysilylated epoxy resin having controlled distribution of molecular weight may be obtained.

In the alkoxysilylation reaction, the epoxy resin (hereinafter, also referred to as "epoxy (F1)") having controlled distribution of molecular weight obtained in the molecular weight control reaction may react with isocyanate alkoxysilane such that alkoxysilylated epoxy (hereinafter also referred to as "epoxy (F2)") having controlled distribution of molecular weight may be produced, where the reaction may be carried out by mixing epoxy (F1) and isocyanate alkoxysilane and heating a mixture obtained by the mixing.

The isocyanate alkoxysilane used in the alkoxysilylation reaction may be represented by chemical formula B as below:

$$OCN(CH_2)_3SiR_1R_2R_3 \quad [\text{Formula B}]$$

At least one of $R_1$ to $R_3$ may be a C1-C5 alkoxy group, preferably a C1-C3 alkoxy group, and the remainder may be a C1-C10 alkyl group.

In the alkoxysilylation reaction, the hydroxyl group in the epoxy (F1) and the alkoxysilane group of the isocyanate alkoxysilane may react in an equivalent ratio according to stoichiometry. Accordingly, the degree of alkoxysilylation may be controlled by reacting isocyanate alkoxysilane in a suitable ratio according to the degree to which the hydroxyl group is to be alkoxysilylated in the epoxy (F1). For example, 1.2 equivalents or less of the isocyanate alkoxysilane, preferably 0.1 to 1.2 equivalents, more preferably 0.3 to 1.0 equivalents, still more preferably 1 equivalent relative to 1 equivalent of the hydroxyl group of the epoxy (F1) may be reacted. The alkoxysilylation reaction may be an optional stage, and the lower limit of the amount of isocyanate alkoxysilane used may not be particularly limited. However, in the case in which the alkoxysilylation reaction is carried out, in consideration of the alkoxysilyl group formation intended for the alkoxysilylation reaction an amount of 0.1 equivalent or more may preferably be used. For example, when the amount of isocyanate alkoxysilane is less than 0.1 equivalent relative to 1 equivalent of the hydroxyl group of the epoxy (F1), the alkoxysilyl group in the product may be insufficient, and when 1.2 equivalent, the alkoxysilyl group in the product may be sufficient, and thus, it may not be necessary to use the amount exceeding 1.2 equivalent.

In the alkoxysilylation reaction, an amine catalyst may be optionally used if desired. For example, when the alkoxysilylation reaction is carried out at the reaction temperature without a catalyst in the alkoxysilylation reaction, an amine catalyst may not be used. When an amine catalyst is used, although not limited thereto, triethylamine, diisopropylethylamine, pyridine, and the like may be used. A base such as NaOH, KOH, $K_2HCO_3$, or $K_2CO_3$ may not be used because such bases may not be preferable for the molecular weight control reaction and a side reaction may occur by reacting with the isocyanate alkoxysilane. These amine catalysts may be used alone or in a combination of two or more.

The amine catalyst may be used in an amount of 1 equivalent or less relative to 1 equivalent of the hydroxyl group of the epoxy (F1) preferably in terms of reaction efficiency. The amine catalyst may be a component optionally used, and the lower limit of the amount thereof used may not be limited to any particular example, and the intended catalytic action may be exhibited by adding the amine catalyst in an amount of 1 equivalent, and it may not be necessary to add the amine catalyst exceeding the above amount.

In the alkoxysilylation reaction, a solvent may be optionally used if desired. For example, when viscosity of the reactant at the reaction temperature is suitable for the reaction to be carried out without a separate solvent, a solvent may not be used. That is, when viscosity of the reactant is low enough to allow mixing and stirring of the reactant to be carried out smoothly without a solvent, a solvent may not be necessary, which may be easily determined by a person skilled in the art. In the case of using a solvent, any aprotic solvent may be used as long as the solvent may dissolve the reactants well and may be easily removed after the reaction without any adverse effect on the reaction. As the solvent, although not limited thereto, toluene, xylene, acetonitrile, tetra hydro furan (THF), methyl ethyl ketone (MEK), dimethyl formamide (DMF), dimethyl sulfoxide (DMSO), methylene chloride (MC), and the like may be used, for example. These solvents may be used alone or in a combination of two or more. The amount of the solvent to be used may not be particularly limited, and may be used in a suitable amount within a range in which the reactant may be sufficiently dissolved and does not have an undesirable effect on the reaction, and a person skilled in the art may appropriately select a solvent in consideration thereof.

The reaction temperature and reaction time of the alkoxysilylation reaction may vary depending on the reactant, and a hydroxy group of the epoxy resin may have a low reaction rate (reactivity) at low temperature, and thus, the reaction temperature may be preferably 40° C. or more. Also, when the reaction temperature exceeds 150° C., thermal stability of the reactants during the reaction time may be deteriorated. Accordingly, the alkoxysilylation reaction may be carried out at a temperature of 40° C. to 150° C.

The alkoxysilylation reaction may be carried out for 1 hour to 48 hours, preferably for 12 hours to 24 hours. When the time is less than 1 hour, alkoxysilylation of the hydroxyl group may be insufficient, and when the time exceeds 48 hours, no further reaction may not occur, and thus, the time exceeding 48 hours may not be unnecessary.

An alkoxysilylated epoxy resin (epoxy (F2)) having an increased molecular weight and an expanded distribution range of molecular weight may be prepared by the alkoxylation reaction. Also, alkoxysilylated epoxy resins of various molecular weights may be formed together, and the epoxy resins may be prepared in a mixed state thereof and may be used as they are. Specifically, an epoxy resin having controlled distribution of molecular weight according to the present disclosure described in (A) may be prepared by an additional alkoxysilylation reaction.

C. Epoxy Composition

The epoxy resin having a controlled molecular weight of the present disclosure may be used in any field, application, and use in which an epoxy resin is generally used.

In an embodiment of the present disclosure, an epoxy resin composition comprising an epoxy resin (epoxy (F1) and/or epoxy (F2)) having controlled distribution of molecular weight of the present disclosure may be provided.

According to another embodiment of the present disclosure, the epoxy resin composition comprising the epoxy resin (epoxy (F1) and/or epoxy (F2)) having controlled distribution of molecular weight of the present disclosure may further comprise an epoxy resin (hereinafter also referred to as 'epoxy (G)') different from the epoxy resin (epoxy (F1) and/or epoxy (F2)) having controlled distribution of molecular weight of the present disclosure.

According to another embodiment of the present disclosure, an epoxy resin composition comprising an epoxy resin (epoxy (F1) and/or epoxy (F2)) having controlled distribution of molecular weight of the present disclosure, and/or the epoxy composition comprising the epoxy (F1) and/or the epoxy (F2) and the epoxy (G) may further comprise a thermoplastic resin and/or an inorganic filler if desired.

The epoxy resin having controlled distribution of molecular weight according to the present disclosure (epoxy (F1) and/or epoxy (F2)) may be the epoxy resin described in 'A. Epoxy resin of which distribution of molecular weight is controlled,' and the descriptions in A may be applied thereto.

As the epoxy (G), any conventional epoxy resin, which is not the epoxy resin (epoxy (F1) and/or epoxy (F2)) of the present disclosure in which distribution of molecular weight is controlled, may be used. The type and/or physical properties of the conventional epoxy resin are not particularly limited, which are generally known and will not be described in detail. As examples of conventional epoxy resins, although not limited to, at least one selected from among bisphenol, biphenyl, naphthalene, benzene, thiodiphenol, fluorene, anthracene, isocyanurate, triphenylmethane, 1,1,2,2-tetraphenylethane, tetraphenylmethane, 4,4'-diaminodiphenylmethane, aminophenol, a glycidyl-based epoxy resin group selected from a group consisting of a glycidyl ester-based epoxy resin, glycidylamine-based epoxy resins, and glycidyl ether-based epoxy resins having alicyclic, aliphatic or novolac units, and an alicyclic-based epoxy resin may be used. The above-mentioned conventional epoxy resin may also be modified to have an alkoxysilyl group as a conventional epoxy resin.

The epoxy (G) may be an optional component to be blended in the epoxy composition of the present disclosure if desired, and in consideration of the required physical properties (processability, modulus, thermal properties, or the like) of the epoxy material to which the epoxy composition is applied, the epoxy (G) may be blended by 95 wt % or less, preferably 5 wt % to 95 wt % based on the total weight of the epoxy resin. The lower limit of the content as an optional component is not limited, but when the epoxy (G) is used, the epoxy (G) may be used in an amount of 5 wt % or more preferably to exhibit the effect of controlling physical properties and/or processability by using the epoxy (G), and when the amount exceeds 95 wt %, the content of the epoxy (F1) and/or the epoxy (F2) may be relatively small, such that the effect of improving physical properties by the epoxy (F1) and/or the epoxy (F2) may be insufficient. For example, in the epoxy composition of the present disclosure, the epoxy resin may comprise 5 wt % to 95 wt % of epoxy (F1) and/or epoxy (F2) and 5 wt % to 95 wt % of epoxy (G), based on the total weight of the epoxy resin.

The thermoplastic resin may be used for controlling physical properties and/or processability. As the thermoplastic resin, acrylic resin, phenoxy resin, polyvinyl acetal resin, polyimide resin, polyamideimide resin, polyether sulfone resin, polysulfone resin, or the like may be used alone or in a combination of two or more, which may be generally known and will not be described in detail.

When a thermoplastic resin is used, a thermoplastic resin may be used in an amount generally used in the art, and is not particularly limited. However, for example, with respect to 100 parts by weight of the epoxy resin, a thermoplastic resin may be appropriately selected and used in the range of 150 parts by weight or less (a thermoplastic resin is a component optionally added, and the lower limit thereof is not limited), preferably, 10 to 150 parts by weight, although it is not limited thereto.

Also, any conventional inorganic filler generally used in the art may be used as an inorganic filler to reinforce physical properties of the epoxy composition.

Although not limited thereto, for example, any inorganic filler known to be generally used for reinforcing physical properties of an epoxy resin may be used as the inorganic filler. Specifically, although not limited to, for example, an inorganic filler may be selected from a group consisting of silica (including, for example, fused silica and crystalline silica), metal oxides such as zirconia, titania, alumina, silicon nitride and aluminum nitride, and silsesqui oxane. As the inorganic fillers, the above materials may be used alone or as a mixture of two or more. The inorganic filler may be generally known in the art and will not be described in detail.

The inorganic filler may be blended in a range generally used in the art, for example, 90 wt % or less, preferably 70 wt % or less, more preferably 60 wt % or less, and most preferably 50 wt % or less based on the total weight of the solid content of the epoxy composition in consideration of physical properties and/or processability, although it is not limited thereto. When the amount exceeds 90 wt %, the process may be difficult, and the inorganic filler may be a component that is optionally blended, such that the lower limit thereof is not limited. In the present disclosure, the "total weight of the solid content of the epoxy composition" refers to, when liquid components may be incidentally present in the epoxy composition and/or solvents are used in the epoxy composition, a total weight of the solids content of an epoxy composition from which any liquid components such as a solvent are removed and which may be cured. For example, based on the total weight of the solid content of the epoxy composition of the present disclosure, the remaining content excluding the content of the inorganic filler may be the contents of an entirety of organic components such as epoxy resin, thermoplastic resin, curing agent, curing catalyst, and other additives to be described later (for example, when the inorganic filler is 90 wt % based on the total weight of the solid content of the epoxy composition, the remaining content may be 10 wt %).

The epoxy composition of any of the above embodiments may comprise a curing agent and a curing catalyst for curing the epoxy composition, which is common in the art.

As the curing agent, any conventional curing agent generally known as a curing agent for epoxy resins may be used, and although not limited thereto, for example, amine-based, polyphenol-based, acid anhydride-based, or the like may be used, which may be generally known in the art and will not be described in detail.

The content of the curing agent may be adjusted based on the concentration of the epoxide group of the epoxy resin according to the desired range of degree of curing. Although not limited thereto, for example, the curing agent is preferably used by controlling the content of the curing agent so that the ratio of equivalents of epoxide groups: equivalents of reactive functional groups with the epoxide groups of the curing agent is 1:0.5 to 2.0, preferably 1:0.8 to 1.5.

The reactive functional group with the epoxide group of the curing agent may be, for example, an amine group in an amine-based catalyst and a phenolic hydroxyl group in a polyphenol-based catalyst, which are generally known in the art.

As the curing catalyst, any conventional curing catalyst known to be generally used for curing the epoxy composition in the art may be used, and the curing catalyst is not limited thereto. For example, a curing catalyst such as a tertiary amine-based, quaternary ammonium-based, organic acid salt-based, or phosphorus-based compound may be used, which is generally known in the art and will not be described in detail.

The curing catalyst may be used in an amount generally used in the art. Although not limited thereto, for example, the curing catalyst may be used by 0.1 to 10 parts by weight, for example, 0.2 to 5 parts by weight based on 100 parts by weight of the epoxy resin. The curing catalyst may preferably be used in the above content in terms of the curing reaction accelerating effect and curing reaction rate control. By using the curing catalyst in an amount within the above range, curing may be effectively facilitated, and an improvement in throughput may be expected.

The epoxy composition according to any embodiment of the present disclosure may further comprises other conventional additives such as a flame retardant, plasticizer, antibacterial agent, leveling agent, defoamer, colorant, stabilizer, coupling agent, viscosity regulator, diluent, and molding agent, or the like which may be generally blended in an epoxy composition in the art for controlling physical properties of the composition if desired in a range in which physical properties of the epoxy composition is not impaired. Also, the epoxy composition may be dispersed using a solvent if desired such that formulation may be easily dispersed before curing. The types, formulation, content, or the like of these other additives and/or solvents are generally known to a person skilled in the art, and are not described in detail.

According to another embodiment of the present disclosure, a cured product of the epoxy composition according to any of the above embodiments may be provided. The cured product may be obtained by curing the epoxy composition, such as, for example, by thermal curing, and the curing method and curing conditions of the epoxy composition are generally known in the art and will not be described in detail. In addition, the term, "cured product" is used in the meaning including the composite.

According to another embodiment of the present disclosure, an article comprising any epoxy composition and/or cured product of the present disclosure described above may be provided. The article may be a semiconductor material, a semiconductor component, a semiconductor device, an electrical material, an electrical component, an electrical device, an electronic material, an electronic component, an electronic device, or the like. The semiconductor device may include a semiconductor material and/or a semiconductor component, the electrical device may include the electrical material and/or an electrical component and the electronic device may include the electronic material and/or an electronic component. Semiconductor and/or electronic materials may include, although are not limited to, for example, a semiconductor substrate, prepreg, a laminate in which a metal layer is disposed on the prepreg, a substrate, an encapsulating material (packaging material), a build-up film, or the like, and also a printed wiring board, or the like.

Specifically, the epoxy composition and/or cured product of the present disclosure may be used, although not limited thereto, as an epoxy molding compound (EMC) for semiconductor devices, underfill, DAF (die attach film, die bonding film), or the like, for example. Also, the epoxy composition of the present disclosure may be applied to various uses such as adhesives, paints and composite materials.

EXAMPLE

Hereinafter, the present disclosure will be described in greater detail through examples. However, the present disclosure is not limited to the examples as below.

A. Synthesis Example

Synthesis Example 1

65g of bisphenol A novolac epoxy resin (KEB-3180-M80, Kolon Industries, corresponding to the above formula (AS), EEW 210 g/Eq), 2.95 g of bisphenol A, 2.43 g of phenol, and 16.3 g of methyl ethyl ketone (MEK) were added into a two-neck flask at room temperature (20 to 25° C., hereinafter the same) and were stirred at 115° C. to obtain a uniform solution. Thereafter, 0.11 g of triphenylphosphine (TPP) was added to the flask and molecular weight control reaction was carried out at 115° C. for 5 hours. After the molecular weight control reaction is completed, the temperature of the flask was lowered to 80° C., and then, 150 g of methyl ethyl ketone (MEK), 9.99g of N,N-diisopropylethylamine (DIPEA), and 19.11g of 3-(triethoxysilyl) propyl isocyanate (TEOS) were added, and were heated and stirred for 12 hours additionally. Thereafter, the temperature was lowered to room temperature, the base catalyst and the solvent were removed using a rotary evaporator, and the mixture was dried using a vacuum pump to obtain an epoxy resin having an alkoxysilyl group with controlled distribution of molecular weight. Physical properties of the epoxy resin (epoxy (F1)) having a controlled molecular weight and alkoxysilylated epoxy resin (epoxy (F2)) having controlled distribution of molecular weight, obtained in the molecular weight control reaction of the present synthesis example, are shown in Table 2.

Synthesis Example 2

Bisphenol A novolac epoxy resin (KEB-3180-M80, Kolon Industries, corresponding to the above formula (AS), EEW 210 g/Eq) and bisphenol A were used as starting materials for the molecular weight control reaction. The reaction was carried out in the same manner as in synthesis example 1 under the reaction conditions and compound content shown in Table 1 below. Physical properties of the epoxy resin (epoxy (F1)) having a controlled molecular weight and alkoxysilylated epoxy resin (epoxy (F2)) having controlled distribution of molecular weight, obtained in the molecular weight control reaction of the present synthesis example, are shown in Table 2 below.

Synthesis Example 3

Bisphenol A novolac epoxy resin (corresponding to the above formula (AS), EEW 210 g/Eq) and naphthalene-1,6-diol were used as starting materials for the molecular weight control reaction. The reaction was carried out in the same manner as in synthesis example 1 under reaction conditions and compound content shown in Table 1 below. Physical properties of the epoxy resin (epoxy (F1)) having a controlled molecular weight and alkoxysilylated epoxy resin (epoxy (F2)) having controlled distribution of molecular weight, obtained in the molecular weight control reaction of the present synthesis example, are shown in Table 2 below.

Synthesis Example 4

As starting materials for molecular weight control reaction, phenol novolac epoxy resin (EPALLOY-8330, HUNTSMAN, corresponding to the above formula (BS) (s=

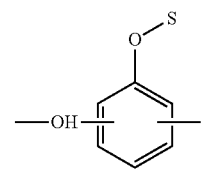

EEW 180 g/Eq), 1,1'-biphenyl-4,4'-diol and phenol were used. The reaction was carried out in the same manner as in synthesis example 1 under the reaction conditions and compound content shown in Table 1 below. Physical properties of the epoxy resin (epoxy (F1)) having a controlled molecular weight and alkoxysilylated epoxy resin (epoxy (F2)) having controlled distribution of molecular weight, obtained in the molecular weight control reaction of the present synthesis example, are shown in Table 2 below.

Synthesis Example 5

Ortho-cresol novolac epoxy resin (YDCN-500-80P, Kukdo chemical, corresponding to the above formula (CS), EEW 200 g/Eq), bisphenol A and phenol were used as starting materials for the molecular weight control reaction. The reaction was carried out in the same manner as in synthesis example 1 under the reaction conditions and compound content shown in Table 1 below. Physical properties of the epoxy resin (epoxy (F1)) having a controlled molecular weight and alkoxysilylated epoxy resin (epoxy (F2)) having controlled distribution of molecular weight, obtained in the molecular weight control reaction of the present synthesis example, are shown in Table 2 below.

Synthesis Example 6

As starting materials for the molecular weight control reaction, naphthalene novolac epoxy resin (ESN-175, Shin-Nitetsu chemical, corresponding to the above formula (DS), EEW 265g/Eq), 1,4-dihydroxybenzene and phenol were used. The reaction was carried out in the same manner as in synthesis example 1 under the reaction conditions and compound content shown in Table 1 below. Physical properties of the epoxy resin (epoxy (F1)) having a controlled molecular weight and alkoxysilylated epoxy resin (epoxy (F2)) having controlled distribution of molecular weight, obtained in the molecular weight control reaction of the present synthesis example, are shown in Table 2 below.

Synthesis Example 7

Bisphenol A novolac epoxy resin (KEB-3180-M80, Kolon Industries, corresponding to the above formula (AS), EEW 210 g/Eq), 4,4'-(9H-fluorene-9,9-diyl)diphenol and phenol were used as starting materials for molecular weight control reaction. The reaction was carried out in the same manner as in synthesis example 1 under the reaction conditions and compound content shown in Table 1 below.

Physical properties of the epoxy resin (epoxy (F)) having a controlled molecular weight and alkoxysilylated epoxy resin (epoxy (F2)) having controlled distribution of molecular weight, obtained in the molecular weight control reaction of the present synthesis example, are shown in Table 2 below.

TABLE 1

Reaction conditions of Synthesis Example

| | Molecular Weight Control Reaction | | | | | | Alkoxylation Reaction | | | |
|---|---|---|---|---|---|---|---|---|---|---|
| | Staring | Aromatic Alcohol (g) | | | | | | | | |
| | Epoxy Resin (g) | 2 Func-tionality | Phenol | TPP (g) | MEK (g) | Reaction temperature and time | TEOS (g) | DIPEA (g) | MEK (g) | Reaction temperature and time |
| Syn Ex.1 | 65 | 2.95 | 2.43 | 0.11 | 16 | 115° C./5 h | 19.11 | 9.99 | 150 | 80° C./12 h |
| Syn Ex.2 | 65 | 5.38 | — | 0.11 | 16 | 115° C./5 h | 12.79 | 6.68 | 150 | 80° C./12 h |
| Syn Ex.3 | 65 | 2.48 | — | 0.05 | 16 | 115° C./3 h | 7.66 | 4.00 | 150 | 80° C./6 h |
| Syn Ex.4 | 65 | 2.58 | 5.21 | 0.65 | 28 | 135° C./5 h | 20.54 | 10.74 | 150 | 80° C./18 h |
| Syn Ex.5 | 65 | 5.69 | 2.34 | 0.65 | 16 | 115° C./6 h | 18.49 | 9.66 | 150 | 80° C./15 h |
| Syn Ex. 6 | 65 | 1.13 | 1.93 | 0.06 | 16 | 135° C./2 h | 10.13 | 5.30 | 150 | 80° C./8 h |
| Syn Ex.7 | 65 | 6.24 | 3.35 | 0.19 | 28 | 135° C./8 h | 17.61 | 9.20 | 150 | 80° C./18 h |

TABLE 2

Properties of final product

| | Epoxy resin having controlled distribution of molecular weight obtained after molecular weight control reaction (Epoxy (F1)) | | | | Alkoxysilylated epoxy resin having controlled molecular weight control reaction (Epoxy alkoxysilylation reaction (Epoxy (F2))) | | | | |
|---|---|---|---|---|---|---|---|---|---|
| | | Molecular Weight Distribution[1] (vol %) | | | | | Molecular Weight Distribution[1] (vol %) | | |
| | EEW (g/Eq) | Higher MW Region (Greater than 70,000) | Lower MW Region (70,000 or less) | | EEW (g/Eq) | Alkoxysilyl group concentration[2] | Higher MW Region (Greater than 70,000) | Lower MW Region (70,000 or less) | |
| | | | 2,000~70,000 | 300~2,000 | | | | Greater than 2,000~70,000 | 300~2,000 |
| Syn Ex.1 | 274 | 4.9 | 56.2 | 38.9 | 355 | 0.33 | 11.0 | 54.8 | 34.2 |
| Syn Ex.2 | 275 | 4.6 | 56.0 | 39.4 | 329 | 0.21 | 10.5 | 54.6 | 34.9 |
| Syn Ex.3 | 240 | 3.6 | 54.6 | 41.8 | 270 | 0.11 | 9.2 | 53.9 | 36.9 |
| Syn Ex. 4 | 263 | 3.4 | 54.3 | 42.3 | 343 | 0.31 | 8.9 | 53.4 | 37.7 |
| Syn Ex.5 | 293 | 4.7 | 55.9 | 39.4 | 371 | 0.31 | 10.8 | 54.6 | 34.6 |
| Syn Ex. 6 | 333 | 4.1 | 55.2 | 40.7 | 387 | 0.20 | 9.4 | 54.2 | 36.4 |
| Syn Ex.7 | 314 | 5.2 | 56.6 | 38.2 | 392 | 0.30 | 11.4 | 55.2 | 33.4 |

[1]Measurement by gel permeation chromatography using tetrahydrofuran
[2]Molar ratio of [alkoxysilyl group]/[epoxide group]

Comparative Synthesis Example 1

25 g of cresol novolac epoxy resin (YDCN-500-80P, Kukdo chemical, corresponding to the above formula (CS), EEW 200 g/Eq), 2.14g of phenol (monofunctional aromatic alcohol), and 25g of toluene was added in a two-neck flask at room temperature, and were stirred at room temperature for 10 minutes. Thereafter, 0.25g of TPP was added in a flask, the mixture was heated to 110° C., and reaction was carried out for 12 hours. Thereafter, the temperature of the flask was lowered to 80° C., 2.94g of N,N-diisopropylethylamine (DIPEA) and 5.62g of 3-(triethoxysilyl)propyl isocyanate were added, and the mixture was heat and stirred for 12 hours additionally. Thereafter, the temperature was lowered to room temperature, the amine catalyst and the solvent were removed using a rotary evaporator, and the mixture was dried using a vacuum pump such that a final epoxy resin was obtained, and a cured product of comparative example 1 of Table 3 was prepared using this.

Figure 2:
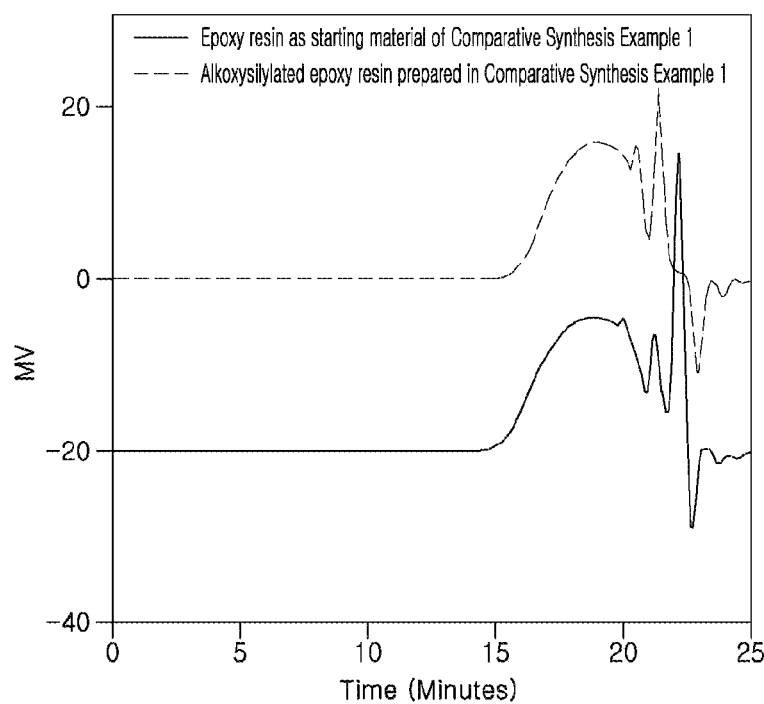
FIG. 2 is a gel permeation chromatograph of the epoxy resin, a starting material, of comparative synthesis example 1 and a prepared alkoxysilylated epoxy resin.

Gel permeation chromatographs of the epoxy resin, a starting material, and the prepared alkoxysilylated epoxy resin (epoxy (F2)) in synthesis example 1 and comparative synthesis example 1 are shown in FIGS. 1 and 2, respectively.

As can be seen in FIG. 1, the epoxy resin with the molecular weight distribution controlled in Synthesis Example 1 had significantly increased the highest molecular weight value and the epoxy resin in the high molecular weight region as compared to the starting material epoxy resin, and exhibited a molecular weight distribution of 300 to 650,000.

As such, an epoxy resin of which the upper limit of the molecular weight range and an epoxy resin in the high molecular weight region (>70,000) were increased was prepared by the method according to the present disclosure.

In comparative synthesis example 1 in which only monofunctional aromatic alcohol was used, as shown in FIG. 2, the molecular weight of alkoxysilylated epoxy resin, which is the final product, was not almost increased compared to the molecular weight of the epoxy resin, which is the starting material and was similar. The alkoxysilylated epoxy resin prepared in comparative synthesis example 1 exhibited distribution of molecular weight of 300 to 70,000.

B. Preparation of Composite and Evaluation of Thermal Expansion Properties (1) Preparation of Epoxy Filler Composite (Cured Product)

With the composition of Table 3 below, a phenol curing agent and silica were dissolved in methyl ethyl ketone such that the solid content becomes 80 wt %. This mixture was mixed for 10 minutes, and then an acrylic resin was added, and the mixture was further mixed for 1 hour. Thereafter, an epoxy resin was added, and the mixture was further mixed for 30 minutes, and a curing catalyst was added and the mixture was further mixed 10 minutes to obtain a uniform solution. The mixture was casted on a release paper, was put it in a convection oven heated to 70° C. to remove the solvent for 30 minutes. The dried sample was cured at 120° C. for 1 hour, and then was further cured in an oven at 180° C. for 2 hours, and a sample for measuring physical properties was prepared in a size of 4 mm×40 mm×0.1 mm (mm$^3$) to evaluate physical properties.

(2) Evaluation of Thermal Expansion Properties

The dimensional changes according to the temperature of the cured products obtained in examples and comparative examples in Table 3 below were evaluated using a Thermo-Mechanical Analyzer, and are shown in CTEs in Table 3 below.

TABLE 3

Composition of epoxy composition and heat resistance properties of cured product

| | | Compound (Syn Ex. No.) | Ex. 1 | Ex. 2 | Ex. 3 | Ex. 4 | Ex. 5 | Ex. 6 | Ex. 7 | Ex. 8 | CEx. 1 | CEx. 2 | CEx. 3 | CEx. 4 | CEx. 5 |
|---|---|---|---|---|---|---|---|---|---|---|---|---|---|---|---|
| Composition (g) | Epoxy Resin | Syn Ex. 1[b] | 2.0 | — | — | — | — | — | — | — | — | — | — | — | — |
| | | Syn Ex. 2[b] | — | 2.0 | — | — | — | — | — | — | — | — | — | — | — |
| | | Syn Ex. 3[b] | — | — | 2.5 | — | — | — | — | — | — | — | — | — | — |
| | | Syn Ex. 4[b] | — | — | — | 3.0 | — | — | — | — | — | — | — | — | — |
| | | Syn Ex. 5[b] | — | — | — | — | 2.0 | — | — | — | — | — | — | — | — |
| | | Syn Ex. 6[b] | — | — | — | — | — | 3.2 | — | — | — | — | — | — | — |
| | | Syn Ex. 7[b] | — | — | — | — | — | — | 2.0 | — | — | — | — | — | — |
| | | Syn Ex. 1[a] | — | — | — | — | — | — | — | 3.0 | — | — | — | — | — |
| | | Comparative Syn Ex. 1 | — | — | — | — | — | — | — | — | 2.0 | — | — | — | — |
| | | DGEBA[1] | 1.0 | 1.0 | 1.0 | 1.0 | 1.0 | 1.0 | 1.0 | 1.0 | 1.0 | 1.0 | 1.0 | 1.0 | 1.5 |
| | | BPA novolac epoxy resin[2] | — | — | — | — | — | — | — | — | — | 2.0 | — | — | 1.2 |
| | | phenoxy resin[3] | — | — | — | — | — | — | — | — | — | — | 1.0 | 2.0 | 0.3 |
| | | acrylic resin[4] | 3.08 | 2.43 | 3.75 | 3.16 | 3.06 | 4.17 | 2.36 | 4.25 | 3.09 | 3.41 | 1.89 | 2.62 | 3.10 |
| | | phenol novolac[5] | 1.30 | 1.35 | 1.73 | 1.67 | 1.27 | 1.61 | 1.24 | 1.93 | 1.31 | 1.76 | 0.64 | 0.66 | 1.63 |

TABLE 3-continued

Composition of epoxy composition and heat resistance properties of cured product

| | Compound (Syn Ex. No.) | Ex. 1 | Ex. 2 | Ex. 3 | Ex. 4 | Ex. 5 | Ex. 6 | Ex. 7 | Ex. 8 | CEx. 1 | CEx. 2 | CEx. 3 | CEx. 4 | CEx. 5 |
|---|---|---|---|---|---|---|---|---|---|---|---|---|---|---|
| | 2-phenyl imidazole | 0.02 | 0.02 | 0.02 | 0.02 | 0.02 | 0.02 | 0.02 | 0.02 | 0.02 | 0.02 | 0.01 | 0.02 | 0.02 |
| | silica | 4.93 | 2.91 | 6.00 | 3.80 | 4.90 | 6.67 | 2.84 | 6.81 | 4.95 | 5.46 | 3.03 | 4.20 | 4.96 |
| heat resistance | CTE (ppm/°C.) $\alpha_1$ (T < $T_g$) | 35 | 40 | 48.5 | 49.0 | 45.2 | 48.8 | 43.0 | 60 | 89 | 110 | Not made into a uniform film | | 95 |
| | $\alpha_2$ (T > $T_g$) | 96 | 100 | 110.0 | 111.8 | 99.5 | 112.5 | 95.5 | 135 | 137 | 170 | | | 160 |

Syn. Ex. 1[(a)]: Epoxy resin obtained after the molecular weight control reaction of Synthesis Example 1
Syn. Ex. 1[(b)] to 7[(b)]: Epoxy resin obtained after the alkoxysilylation reaction of each synthesis example
[(1)]EEW = 180 g/Eq;
[(2)]EEW = 210 g/Eq;
[(3)]Phenoxy Resin, Kukdo chemical;
[(4)]Paracron ®, Negami Chem. Ind.;
[(5)]Curing agent, HEW = 119 g/mol As shown in Table 3, the cured products of examples 1 to 8 comprising the epoxy resins of synthesis examples 1 to 7 having controlled distribution of molecular weight according to the present disclosure had significantly superior thermal expansion properties (that is, low CTE) as compared to comparative example 1. Accordingly, it was confirmed that the thermal expansion properties of the cured epoxy product were remarkably improved by the epoxy resin of which distribution of molecular weight was expanded from the low molecular weight region to the high molecular weight region according to the present disclosure.

Comparative example 2 using a conventional bisphenol A novolac epoxy resin, presented for comparison, had a CTE of 110 ppm/°C., which was inferior to comparative example 1 (i.e., high CTE). In comparative examples 3 and 4 using a high molecular weight phenoxy resin, due to poor processability of the composition, a uniform film was not prepared. As in comparative example 5, when a small amount of a high molecular weight phenoxy resin was used, a film was formed, but physical properties were not good exhibiting a high CTE, which may be because the phenoxy resin exhibited a molecular weight in the high molecular weight region in the range of 70,000 to 1,000,000, but the epoxy resin in the low molecular weight region in the 300 to 2,000 range does not exist. Also, as for the phenoxy resin, a concentration of epoxy group was too low to measure (EEW>>1000 g/Eq), such that it is considered that excellent physical properties as in the epoxy resin having controlled distribution of molecular weight of the present disclosure was not exhibited.

The epoxy resin in which distribution of molecular weight is adjusted in the present disclosure may have a broad molecular weight region from a low molecular weight region (70,000 or less, for example, 300 to 70,000) to a high molecular weight region (more than 70,000, for example, more than 70,000 to 2,000,000). As such, in the epoxy resin of the present invention in which the upper limit of the molecular weight is increased as compared to the epoxy resin as a starting material and the distribution range of molecular weight is expanded, thermal properties of the epoxy system may improve due to the epoxy resin having a high molecular weight region, and as the epoxy resin having a low molecular weight region is also present, excellent processability may be obtained. Specifically, excellent physical properties, such as, for example, excellent thermal expansion properties (a low coefficient of thermal expansion (CTE)) and processability, may be exhibited by the board distribution of molecular weight from a low molecular weight region to a high molecular weight region. Therefore, the epoxy resin in which distribution of molecular weight is adjusted, and/or the epoxy composition comprising the same of the present disclosure may be effectively used in applications requiring low thermal expansion of a cured epoxy product, flexibility, film formability, coating properties, and/or adhesion.

Also, in the method of preparing an epoxy resin in which distribution of molecular weight is adjusted in the present disclosure, by adjusting the ratio and/or concentration of the difunctional aromatic alcohol and selectively the monofunctional aromatic alcohol, the increase of molecular weight and the distribution range of molecular weight of the epoxy resin can be easily adjusted. That is, the resulting epoxy resin obtained by the method of the present disclosure may have a broad molecular weight region including the molecular weight from a low molecular weight region 70,000 or less to a high molecular weight region of greater than 70,000 to 2,000,000. Therefore, the method of preparing the epoxy resin in the present disclosure may address the existing issue of difficulty of preparing an epoxy resin comprising a high molecular weight region.

While the embodiments have been illustrated and described above, it will be apparent to a person skilled in the art that modifications and variations could be made without departing from the scope of the present disclosure as defined by the appended claims.

What is claimed is:

1. An epoxy resin having a controlled molecular weight distribution, comprising:

(1) one of a first structural unit selected from a group consisting of formulas (AF), (BF), (CF) and (DF); and (2) one of a second structural unit selected from a group consisting of formulas (1F), (2F), (3F), (4F) and (5F), wherein the first structural unit and the second structural unit are connected to each other via formula (L), and wherein epoxy equivalent weight (EEW, Epoxy Equivalent Weight) determined by the glycidyl group of formula (E) is 200 g/Eq to 1,000 g/Eq, and a distribution range of molecular weight is 300 to 2,000,000:

(AF)
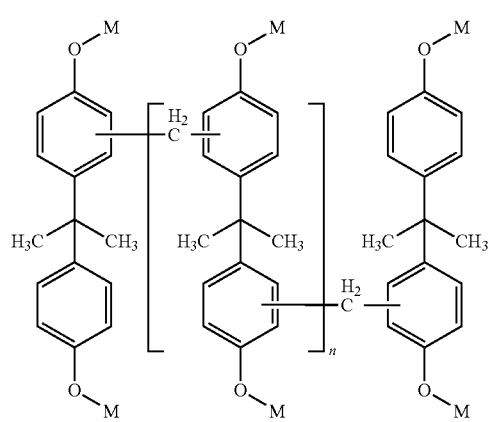

(BF)
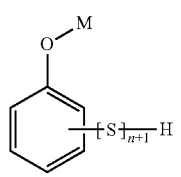

(CF)
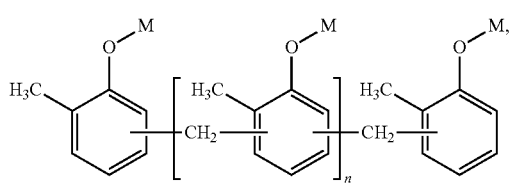

(DF)
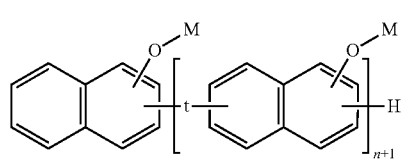

where, in formula (BF), S is

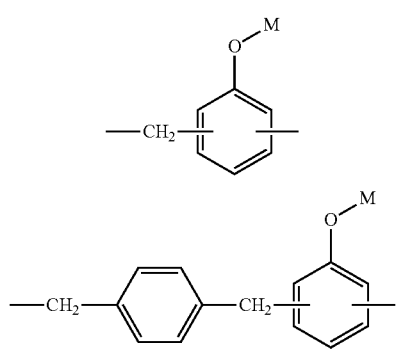

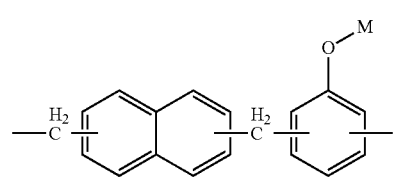

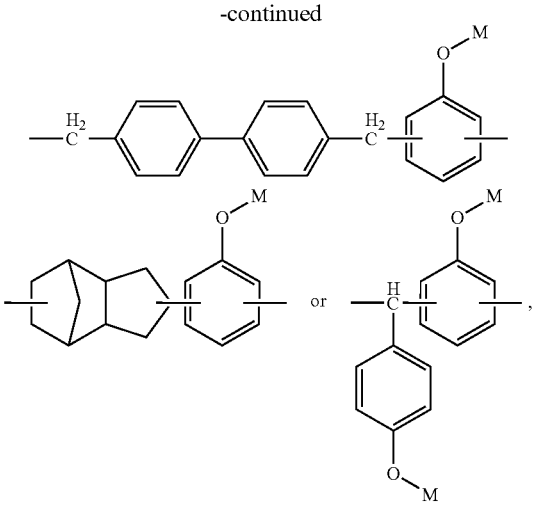

in formula (DF), t is

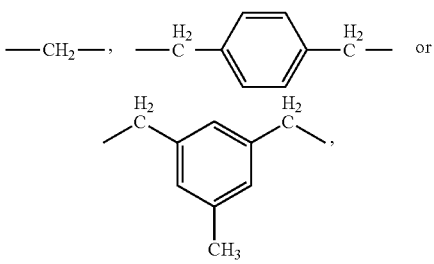

in formulas (AF) to (DF), n is an integer from 1 to 100,
the epoxy resin has or does not have at least one of formulas (S1) and (S2),
when the epoxy resin has at least one of formulas (S1) and (S2), at least one of a plurality of M is connected by a single bond to ** in formula (L), a part of the remainder of M is a glycidyl group of formula (E) such that an epoxy equivalent weight (EEW) of an epoxy resin is 200 g/Eq to 1,000 g/Eq, and the remainder of M is at least one selected from a group consisting of formula (S1) and (S2),
when the epoxy resin does not have at least one of formulas (S1) and (S2), at least one of a plurality of M is connected by a single bond to ** in formula (L), and the remainder of M is a glycidyl group of following formula (E) such that an epoxy equivalent weight (EEW) of an epoxy resin is 200 g/Eq to 1,000 g/Eq, (L)
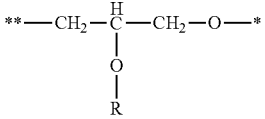

where, in formula (L), R is H or —C(=O)—NH—(CH$_2$)$_3$-SiR$_1$R$_2$R$_3$, where at least one of R$_1$ to R$_3$ is a C$_1$-C$_5$ alkoxy group, and the remainder is a C1-C10 alkyl group, and
** is a connection by a single bond to M in formulas (AF), (BF), (CF) or (DF), and * is a connection by a single bond to * in formulas (1F), (2F), (3F), (4F) or (5F),

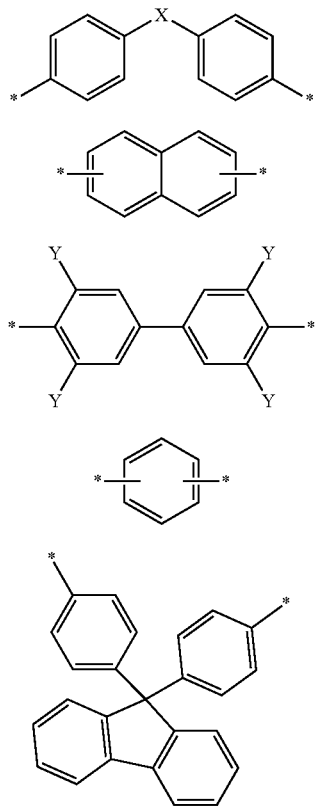

where, in formula (1F), X is —CH$_2$—, —C(CH$_3$)$_2$—, —C(CF$_3$)$_2$—, —S— or —SO$_2$—, and in formula (3F), each Y is independently selected from H and a methyl group, each * in formulas (1F) to (5F) is a connection by a single bond to * in formula (L),

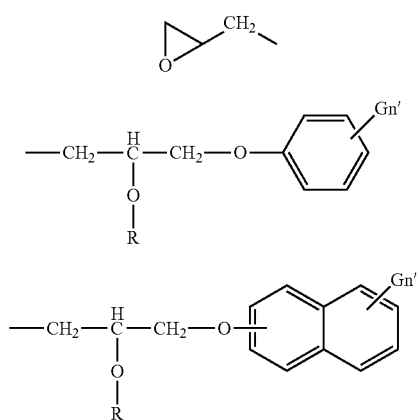

where, in formulas (S1) and (S2), R is hydrogen or —C(=O)—NH—(CH$_2$)$_3$—SiR$_1$R$_2$R$_3$, where at least one of R$_1$ to R$_3$ is a C1-C5 alkoxy group, and remainder is a C1-C10 alkyl group, each G is independently selected from a group consisting of a C1 to C10 alkyl group, an allyl group, and a C6 or C10 aryl group, and each n' is independently an integer of 0 to 5.

2. The epoxy resin of claim 1, wherein, in the epoxy resin, a content of the epoxy resin, which is a high molecular weight region having a molecular weight of more than 70,000 to 2,000,000, is 3 vol % to 50 vol %, and a content of the epoxy resin, which is a low molecular weight region having a molecular weight of 300 to 70,000 or less, is 50 vol % to 97 vol %, based on a total volume of the epoxy resin.

3. The epoxy resin of claim 2, wherein, in the low molecular weight region, a content of the epoxy resin having a molecular weight of 300 to 2,000 is 30 vol % to 90 vol %, and a content of the epoxy resin having a molecular weight of more than 2,000 to 700,000 is 10 vol % to 70 vol %, based on a total volume of the epoxy resin, which is the low molecular weight region.

4. The epoxy resin of claim 1, wherein the epoxy resin has a molar ratio of [alkoxysilyl group]/[epoxide group] of 0.5 or less.

5. An epoxy composition comprising the epoxy resin of claim 1.

6. The epoxy composition of claim 5, wherein the epoxy composition further comprises an epoxy resin other than the epoxy resin of claim 1.

7. The epoxy composition of claim 6, wherein the epoxy composition further comprises a thermoplastic resin.

8. A cured product of the epoxy composition of claim 6.

9. The epoxy composition of claim 5, wherein the epoxy composition further comprises a thermoplastic resin.

10. A cured product of the epoxy composition of claim 9.

11. A cured product of the epoxy composition of claim 5.

12. An article comprising the cured product of claim 11.

13. The article of claim 12, wherein the article is at least one selected from a group consisting of a semiconductor packaging material, a semiconductor component, a semiconductor device, an electrical material, an electrical component, an electrical device, an electronic material, an electronic component, and an electronic device.

14. A method of preparing an epoxy resin by a molecular weight control reaction of mixing one of an epoxy resin selected from a group consisting of formulas (AS) to (DS) and one of difunctional aromatic alcohol selected from a group consisting of formulas (1) to (5) in a presence of a phosphine-based catalyst and heating a mixture obtained by the mixing:

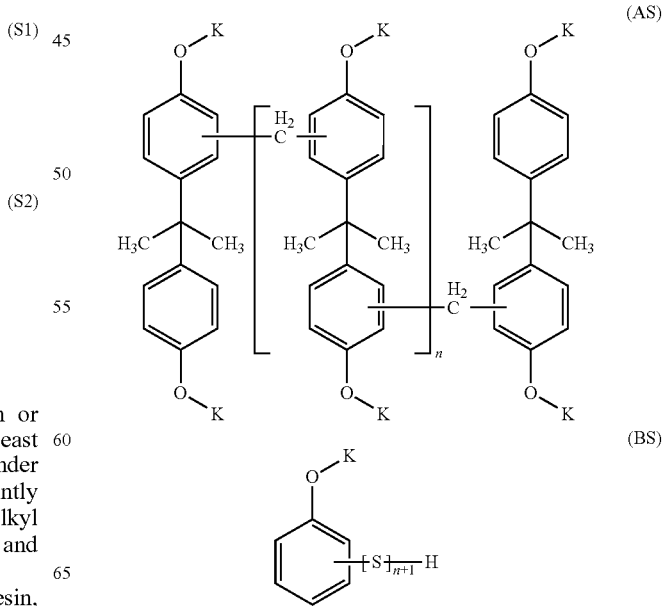

-continued

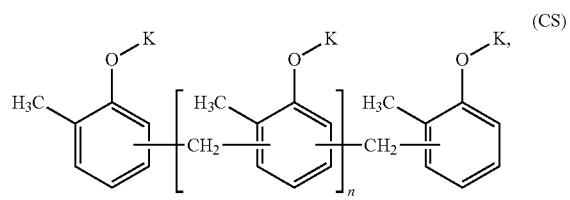
(CS)

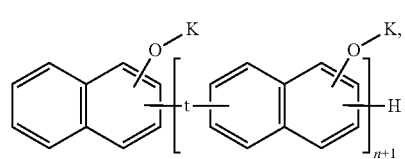
(DS)

where, in formula BS, S is

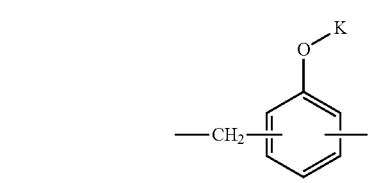

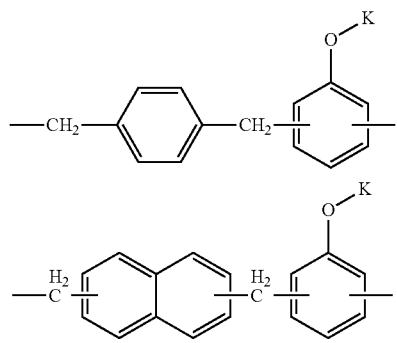

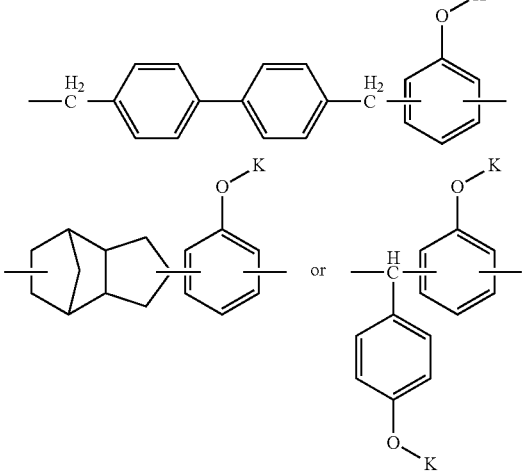

in formula DS, t is

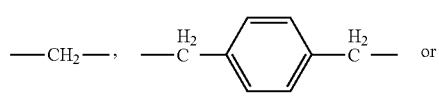

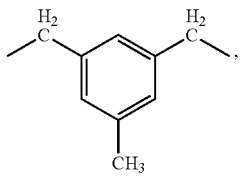

in formulas AS to DS, n is an integer from 1 to 100, and K is a glycidyl group of formula (E),

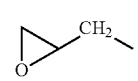
(E)

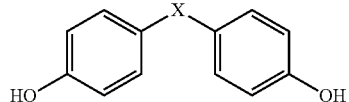
(1)

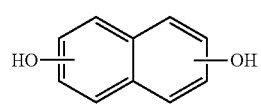
(2)

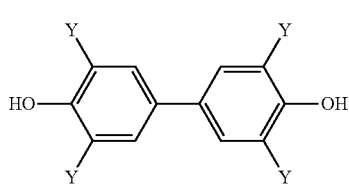
(3)

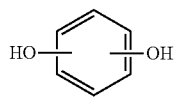
(4)

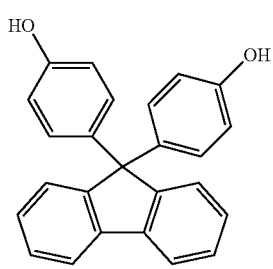
(5)

where, in formula (1), X is —CH$_2$—, —C(CH$_3$)$_2$—, —C(CF$_3$)$_2$—, —S— or —SO$_2$—, and in formula (3), each Y is independently selected from a group consisting of H and a methyl group.

15. The method of claim 14, wherein, difunctional aromatic alcohol is used in an amount that the hydroxyl group of the difunctional aromatic alcohol is 0.05 to 0.5 equivalents relative to 1 equivalent of the epoxy group of the epoxy resin as the starting material.

16. The method of claim 14, wherein at least one of monofunctional aromatic alcohol selected from formulas (6) and (7) is used together with the difunctional aromatic alcohol:

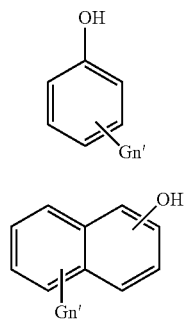

(6)

(7)

where, in the above formula, each G is independently selected from a group consisting of a C1 to C10 alkyl group, an allyl group, and a C6 or C10 aryl group, and each n' is independently an integer of 0 to 5.

17. The method of claim 16, wherein the monofunctional aromatic alcohol is used in an amount of 0.05 to 0.5 equivalents relative to 1 equivalent of an epoxy group of the epoxy resin which is a starting material.

18. The method of claim 14, wherein the molecular weight control reaction is carried out at a temperature of 80° C. to 120° C.

19. The method of claim 14, wherein the molecular weight control reaction is carried out for 1 hour to 12 hours.

20. The method of one of claim 14, wherein, after the molecular weight control reaction, an alkoxysilylation reaction by mixing an epoxy resin prepared by the molecular weight control reaction and an isocyanate alkoxysilane of formula B and heating a mixture obtained by the mixing is further included,

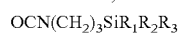 [Formula B]

where at least one of $R_1$ to $R_3$ is a $C_1$-$C_5$ alkoxy group, and remainder is a C1-C10 alkyl group.

* * * * *